(12) United States Patent
Bowles et al.

(10) Patent No.: US 10,853,873 B2
(45) Date of Patent: Dec. 1, 2020

(54) KIOSKS FOR EVALUATING AND PURCHASING USED ELECTRONIC DEVICES AND RELATED TECHNOLOGY

(71) Applicant: ecoATM, LLC, San Diego, CA (US)

(72) Inventors: Mark Vincent Bowles, San Diego, CA (US); Thomas L. Tullie, Rancho Santa Fe, CA (US); Eric Rosser, San Diego, CA (US)

(73) Assignee: ecoATM, LLC, San Diego, CA (US)

( * ) Notice: Subject to any disclaimer, the term of this patent is extended or adjusted under 35 U.S.C. 154(b) by 969 days.

(21) Appl. No.: 15/091,487

(22) Filed: Apr. 5, 2016

(65) Prior Publication Data

US 2016/0284019 A1  Sep. 29, 2016

Related U.S. Application Data

(63) Continuation-in-part of application No. 13/705,252, filed on Dec. 5, 2012, now abandoned, which is a
(Continued)

(51) Int. Cl.
*G06Q 30/02* (2012.01)
*G06Q 30/08* (2012.01)
(Continued)

(52) U.S. Cl.
CPC ........ *G06Q 30/08* (2013.01); *G06K 7/10861* (2013.01); *G06K 9/209* (2013.01); *G06K 9/4661* (2013.01); *G06K 9/6202* (2013.01); *G06K 9/78* (2013.01); *G06K 19/0776* (2013.01); *G06Q 10/30* (2013.01); *G06Q 20/18* (2013.01); *G06Q 30/0237* (2013.01); *G06Q 30/0278* (2013.01);
(Continued)

(58) Field of Classification Search
CPC ..................................................... G06Q 30/08
See application file for complete search history.

(56) References Cited

U.S. PATENT DOCUMENTS 3,808,439 A  4/1974  Renius
4,248,334 A  2/1981  Hanley et al.
(Continued)

FOREIGN PATENT DOCUMENTS

| CN | 1365479 | 8/2002 |
|---|---|---|
| CN | 2708415 | 7/2005 |

(Continued)

OTHER PUBLICATIONS

Notice of Allowance dated Dec. 14, 2017 in U.S. Appl. No. 13/792,030, 5 pages.
(Continued)

*Primary Examiner* — Arthur Duran
*Assistant Examiner* — Breffni Baggot
(74) *Attorney, Agent, or Firm* — Perkins Coie LLP

(57) ABSTRACT

A process for a pre-acquisition auction for recycled electronic devices is disclosed herein. A plurality of pre-acquisition purchase prices are established with each of the plurality of pre-acquisition purchase prices established for a recycled electronic device in a predetermined condition, and each of the pre-acquisition purchase prices established by a winning bid from a bidder of a plurality of bidders for a recycled electronic device.

20 Claims, 21 Drawing Sheets

Related U.S. Application Data continuation-in-part of application No. 13/438,924, filed on Apr. 4, 2012, now Pat. No. 10,055,798, which is a continuation-in-part of application No. 12/785,465, filed on May 23, 2010, now Pat. No. 8,200,533, which is a continuation-in-part of application No. 12/727,624, filed on Mar. 19, 2010, now Pat. No. 7,881,965, which is a continuation-in-part of application No. 12/573,089, filed on Oct. 2, 2009, now Pat. No. 8,195,511, application No. 15/091,487, filed on Apr. 5, 2016, which is a continuation-in-part of application No. 13/753,539, filed on Jan. 30, 2013, now abandoned, which is a continuation-in-part of application No. 13/438,924, filed on Apr. 4, 2012, now Pat. No. 10,055,798, application No. 15/091,487, filed on Apr. 5, 2016, which is a continuation-in-part of application No. 13/658,825, filed on Oct. 24, 2012, now abandoned, which is a continuation-in-part of application No. 13/492,835, filed on Jun. 9, 2012, now abandoned, which is a continuation of application No. 12/785,465, filed on May 23, 2010, now Pat. No. 8,200,533, application No. 15/091,487, filed on Apr. 5, 2016, which is a continuation-in-part of application No. 13/733,984, filed on Jan. 4, 2013, now abandoned, which is a continuation-in-part of application No. 13/438,924, filed on Apr. 4, 2012, now Pat. No. 10,055,798, application No. 15/091,487, filed on Apr. 5, 2016, which is a continuation-in-part of application No. 13/658,828, filed on Oct. 24, 2012, now abandoned, which is a continuation-in-part of application No. 13/492,835, filed on Jun. 9, 2012, now abandoned, application No. 15/091,487, filed on Apr. 5, 2016, which is a continuation-in-part of application No. 13/693,032, filed on Dec. 3, 2012, now abandoned, which is a continuation-in-part of application No. 13/438,924, filed on Apr. 4, 2012, now Pat. No. 10,055,798, application No. 15/091,487, filed on Apr. 5, 2016, which is a continuation-in-part of application No. 13/792,030, filed on Mar. 9, 2013, now Pat. No. 9,881,284, which is a continuation-in-part of application No. 13/438,924, filed on Apr. 4, 2012, now Pat. No. 10,055,798, application No. 15/091,487, filed on Apr. 5, 2016, which is a continuation-in-part of application No. 13/794,814, filed on Mar. 12, 2013, now abandoned, which is a continuation-in-part of application No. 13/693,032, filed on Dec. 3, 2012, now abandoned, application No. 15/091,487, filed on Apr. 5, 2016, which is a continuation-in-part of application No. 13/794,816, filed on Mar. 12, 2013, now abandoned, which is a continuation-in-part of application No. 13/693,032, filed on Dec. 3, 2012, now abandoned.

(60) Provisional application No. 61/570,309, filed on Dec. 14, 2011, provisional application No. 61/595,154, filed on Feb. 6, 2012, provisional application No. 61/472,611, filed on Apr. 6, 2011, provisional application No. 61/102,304, filed on Oct. 2, 2008, provisional application No. 61/183,510, filed on Jun. 2, 2009, provisional application No. 61/607,548, filed on Mar. 6, 2012, provisional application No. 61/607,572, filed on Mar. 6, 2012, provisional application No. 61/593,358, filed on Feb. 1, 2012, provisional application No. 61/551,410, filed on Oct. 25, 2011, provisional application No. 61/606,997, filed on Mar. 6, 2012, provisional application No. 61/607,001, filed on Mar. 6, 2012, provisional application No. 61/583,232, filed on Jan. 5, 2012.

(51) Int. Cl.
| | | |
|---|---|---|
| *G06Q 10/00* | (2012.01) | |
| *G06K 19/077* | (2006.01) | |
| *G06K 7/10* | (2006.01) | |
| *G07F 7/06* | (2006.01) | |
| *H04M 1/02* | (2006.01) | |
| *H04M 1/24* | (2006.01) | |
| *G06Q 20/18* | (2012.01) | |
| *G06K 9/20* | (2006.01) | |
| *G06K 9/46* | (2006.01) | |
| *G06K 9/62* | (2006.01) | |
| *G06K 9/78* | (2006.01) | |
| *G06T 7/00* | (2017.01) | |

(52) U.S. Cl.
CPC ....... *G06Q 30/0283* (2013.01); *G06T 7/0002* (2013.01); *G07F 7/06* (2013.01); *H04M 1/0287* (2013.01); *H04M 1/24* (2013.01); *G06K 2209/03* (2013.01); *Y02W 30/826* (2015.05); *Y02W 90/20* (2015.05)

(56) References Cited

U.S. PATENT DOCUMENTS

| | | |
|---|---|---|
| 4,519,522 A | 5/1985 | McElwee et al. |
| 4,593,820 A | 6/1986 | Antonie et al. |
| 4,845,636 A | 7/1989 | Walker |
| 4,870,357 A | 9/1989 | Young et al. |
| 4,878,736 A | 11/1989 | Hekker |
| 4,927,051 A | 5/1990 | Falk et al. |
| 4,951,308 A | 8/1990 | Bishop et al. |
| 5,077,462 A | 12/1991 | Newell et al. |
| 5,091,773 A | 2/1992 | Fouche et al. |
| 5,105,149 A | 4/1992 | Tokura |
| 5,280,170 A | 1/1994 | Baldwin et al. |
| 5,339,096 A | 8/1994 | Beaufort et al. |
| 5,419,438 A | 5/1995 | Squyres et al. |
| 5,570,920 A | 11/1996 | Crisman et al. |
| 5,572,444 A | 11/1996 | Lentz et al. |
| 5,610,710 A | 3/1997 | Canfield et al. |
| 5,717,780 A | 2/1998 | Mitsumune et al. |
| 5,748,084 A | 5/1998 | Isikoff |
| 5,775,806 A | 7/1998 | Allred |
| 5,839,058 A | 11/1998 | Phillips et al. |
| 5,949,901 A | 9/1999 | Nichani et al. |
| 5,965,858 A | 10/1999 | Suzuki et al. |
| 5,966,654 A | 10/1999 | Croughwell et al. |
| 5,987,159 A | 11/1999 | Nichani |
| 5,988,431 A | 11/1999 | Roe et al. |
| 6,029,851 A | 2/2000 | Jenkins et al. |
| 6,041,229 A | 3/2000 | Turner et al. |
| 6,100,986 A | 8/2000 | Rydningen |
| 6,228,008 B1 | 5/2001 | Pollington et al. |
| 6,259,827 B1 | 7/2001 | Nichani |
| 6,264,104 B1 | 7/2001 | Jenkins et al. |
| 6,330,354 B1 | 12/2001 | Companion et al. |
| 6,330,958 B1 | 12/2001 | Ruskin et al. |
| 6,393,095 B1 | 5/2002 | Robinson et al. |
| 6,462,644 B1 | 10/2002 | Howell et al. |
| 6,529,837 B1 | 3/2003 | Kang et al. |
| 6,535,637 B1 | 3/2003 | Wootton et al. |
| 6,587,581 B1 | 7/2003 | Matsuyama et al. |
| 6,595,684 B1 | 7/2003 | Casagrande et al. |
| 6,633,377 B1 | 10/2003 | Weiss et al. |
| 6,667,800 B1 | 12/2003 | Larsson et al. |
| 6,748,296 B2 | 6/2004 | Banerjee et al. |
| 6,754,637 B1 | 6/2004 | Stenz |
| 6,758,370 B2 | 7/2004 | Cooke et al. |
| 6,798,528 B1 | 9/2004 | Hartman |
| 6,822,422 B2 | 11/2004 | Sagawa |

(56) References Cited

U.S. PATENT DOCUMENTS

| | | |
|---|---|---|
| 6,842,596 B2 | 1/2005 | Morii et al. |
| 6,854,656 B2 | 2/2005 | Matsumori et al. |
| 7,069,236 B1 | 6/2006 | Tsunenari |
| 7,076,449 B2 | 7/2006 | Tsunenari et al. |
| 7,234,609 B2 | 6/2007 | DeLazzer et al. |
| 7,251,458 B2 | 7/2007 | O'Connell et al. |
| 7,268,345 B2 | 9/2007 | Schultz |
| 7,334,729 B2 | 2/2008 | Brewington et al. |
| 7,455,226 B1 | 11/2008 | Hammond et al. |
| 7,520,666 B2 | 4/2009 | Pevzner et al. |
| 7,567,344 B2 | 7/2009 | LeBlanc et al. |
| 7,646,193 B2 | 1/2010 | Suzuki et al. |
| 7,702,108 B2 | 4/2010 | Amon et al. |
| 7,735,125 B1 | 6/2010 | Alvarez et al. |
| 7,761,331 B2 | 7/2010 | Low et al. |
| 7,783,379 B2 | 8/2010 | Beane et al. |
| 7,848,833 B2 | 12/2010 | Li et al. |
| 7,881,965 B2 | 2/2011 | Bowles et al. |
| 8,019,588 B1 | 9/2011 | Wohlberg et al. |
| 8,025,229 B2 | 9/2011 | Hammond et al. |
| 8,031,930 B2 | 10/2011 | Wang et al. |
| 8,107,243 B2 | 1/2012 | Guccione et al. |
| 8,112,325 B2 | 2/2012 | Foy et al. |
| 8,195,511 B2 | 6/2012 | Bowles et al. |
| 8,200,736 B2 | 6/2012 | Shi et al. |
| 8,215,546 B2 | 7/2012 | Lin et al. |
| 8,239,262 B2 | 8/2012 | Bowles et al. |
| 8,254,883 B2 | 8/2012 | Uchida et al. |
| 8,266,008 B1 | 9/2012 | Siegel et al. |
| 8,423,404 B2 | 4/2013 | Bowles et al. |
| 8,463,646 B2 | 6/2013 | Bowles et al. |
| 8,718,717 B2 | 5/2014 | Vaknin et al. |
| 8,743,215 B1 | 6/2014 | Lee |
| 8,806,280 B2 | 8/2014 | Stephenson et al. |
| 8,823,794 B2 | 9/2014 | Waring et al. |
| 9,043,026 B2 | 5/2015 | Lien et al. |
| 9,189,911 B2 | 11/2015 | Kavli et al. |
| 9,317,989 B2 | 4/2016 | Grow et al. |
| 9,818,160 B2 | 11/2017 | Bowles et al. |
| 9,881,284 B2 | 1/2018 | Bowles |
| 2001/0039531 A1 | 11/2001 | Aoki et al. |
| 2002/0014577 A1 | 2/2002 | Ulrich et al. |
| 2002/0035515 A1 | 3/2002 | Moreno et al. |
| 2002/0067184 A1 | 6/2002 | Smith et al. |
| 2002/0087413 A1 | 7/2002 | Mahaffy et al. |
| 2002/0112177 A1 | 8/2002 | Voltmer et al. |
| 2002/0157033 A1 | 10/2002 | Cox |
| 2002/0162966 A1 | 11/2002 | Yoder |
| 2002/0186878 A1 | 12/2002 | Hoon et al. |
| 2003/0025476 A1 | 2/2003 | Trela |
| 2003/0036866 A1 | 2/2003 | Nair et al. |
| 2003/0061150 A1 | 3/2003 | Kocher et al. |
| 2003/0146898 A1 | 8/2003 | Kawasaki et al. |
| 2003/0170529 A1 | 9/2003 | Sagawa |
| 2003/0191675 A1 | 10/2003 | Murashita |
| 2003/0204289 A1 | 10/2003 | Banerjee et al. |
| 2004/0012825 A1 | 1/2004 | Tesavis et al. |
| 2004/0088231 A1 | 5/2004 | Davis |
| 2004/0114153 A1 | 6/2004 | Andersen et al. |
| 2004/0141320 A1 | 7/2004 | Bock et al. |
| 2004/0150815 A1 | 8/2004 | Sones et al. |
| 2004/0156557 A1 | 8/2004 | Van Der Weij |
| 2004/0156667 A1 | 8/2004 | Van Der Weij et al. |
| 2004/0186744 A1 | 9/2004 | Lux et al. |
| 2004/0189812 A1 | 9/2004 | Gustavsson et al. |
| 2004/0200902 A1 | 10/2004 | Ishioroshi |
| 2004/0205015 A1 | 10/2004 | DeLaCruz et al. |
| 2004/0235513 A1 | 11/2004 | O'Connell |
| 2004/0242216 A1 | 12/2004 | Boutsikakis |
| 2004/0262521 A1 | 12/2004 | Devitt et al. |
| 2005/0043897 A1 | 2/2005 | Meyer et al. |
| 2005/0128551 A1 | 6/2005 | Yang |
| 2005/0143149 A1 | 6/2005 | Becker et al. |
| 2005/0167620 A1 | 8/2005 | Cho et al. |
| 2005/0187657 A1 | 8/2005 | Hashimoto et al. |
| 2005/0216120 A1 | 9/2005 | Rosenberg et al. |
| 2005/0222690 A1 | 10/2005 | Wang et al. |
| 2005/0231595 A1 | 10/2005 | Wang et al. |
| 2005/0240958 A1 | 10/2005 | Nguyen et al. |
| 2006/0038114 A9 | 2/2006 | Cofer et al. |
| 2006/0085158 A1 | 4/2006 | Cakiner |
| 2006/0167580 A1 | 7/2006 | Whittier |
| 2006/0184379 A1 | 8/2006 | Tan et al. |
| 2006/0195384 A1 | 8/2006 | Bauer et al. |
| 2006/0229108 A1 | 10/2006 | Cehelnik |
| 2006/0235747 A1 | 10/2006 | Hammond et al. |
| 2006/0258008 A1 | 11/2006 | Holler et al. |
| 2006/0279307 A1 | 12/2006 | Wang et al. |
| 2006/0280356 A1 | 12/2006 | Yamagashi |
| 2007/0012665 A1 | 1/2007 | Nelson |
| 2007/0057815 A1 | 3/2007 | Foy et al. |
| 2007/0129906 A1 | 6/2007 | Stoecker et al. |
| 2007/0133844 A1 | 6/2007 | Waehner et al. |
| 2007/0140310 A1 | 6/2007 | Rolton et al. |
| 2007/0150403 A1 | 6/2007 | Mock et al. |
| 2007/0205751 A1 | 9/2007 | Suzuki et al. |
| 2007/0263099 A1 | 11/2007 | Motta et al. |
| 2007/0276911 A1 | 11/2007 | Bhumkar et al. |
| 2007/0281734 A1 | 12/2007 | Mizrachi |
| 2007/0282999 A1 | 12/2007 | Tu et al. |
| 2008/0004828 A1 | 1/2008 | Mizrachi |
| 2008/0027581 A1 | 1/2008 | Saether et al. |
| 2008/0033596 A1 | 2/2008 | Fausak et al. |
| 2008/0097770 A1 | 4/2008 | Low et al. |
| 2008/0109746 A1 | 5/2008 | Mayer |
| 2008/0111989 A1 | 5/2008 | Dufour et al. |
| 2008/0149720 A1 | 6/2008 | Colville et al. |
| 2008/0177598 A1 | 7/2008 | Davie et al. |
| 2008/0207198 A1 | 8/2008 | Juric |
| 2008/0231113 A1 | 9/2008 | Guccione et al. |
| 2008/0255901 A1 | 10/2008 | Carroll et al. |
| 2008/0256008 A1 | 10/2008 | Kwok |
| 2008/0281691 A1 | 11/2008 | Pearson et al. |
| 2008/0296374 A1 | 12/2008 | Gonen et al. |
| 2008/0303915 A1 | 12/2008 | Omi |
| 2009/0051907 A1 | 2/2009 | Li et al. |
| 2009/0078775 A1 | 3/2009 | Giebel et al. |
| 2009/0079388 A1 | 3/2009 | Reddy |
| 2009/0177319 A1 | 7/2009 | Garibaldi et al. |
| 2009/0184865 A1 | 7/2009 | Valø et al. |
| 2009/0187491 A1 | 7/2009 | Bull et al. |
| 2009/0190142 A1 | 7/2009 | Taylor et al. |
| 2009/0247133 A1 | 10/2009 | Holmen et al. |
| 2009/0251815 A1 | 10/2009 | Wang et al. |
| 2009/0262341 A1 | 10/2009 | Konopa et al. |
| 2009/0265035 A1 | 10/2009 | Jenkinson et al. |
| 2009/0299543 A1 | 12/2009 | Cox et al. |
| 2009/0312009 A1 | 12/2009 | Fishel |
| 2009/0321511 A1 | 12/2009 | Browne |
| 2009/0322706 A1* | 12/2009 | Austin .............. G06F 3/038 345/175 |
| 2010/0005004 A1 | 1/2010 | Hudak et al. |
| 2010/0051695 A1 | 3/2010 | Yepez et al. |
| 2010/0063894 A1 | 3/2010 | Lundy et al. |
| 2010/0088192 A1* | 4/2010 | Bowles .............. G06Q 10/30 705/26.1 |
| 2010/0110174 A1 | 5/2010 | Leconte et al. |
| 2010/0115887 A1 | 5/2010 | Schroeder et al. |
| 2010/0147953 A1 | 6/2010 | Barkan |
| 2010/0161397 A1 | 6/2010 | Gauthier et al. |
| 2010/0169231 A1 | 7/2010 | Librizzi et al. |
| 2010/0219234 A1 | 9/2010 | Forbes |
| 2010/0228676 A1* | 9/2010 | Librizzi .............. G06Q 10/00 705/306 |
| 2010/0235198 A1 | 9/2010 | Fini et al. |
| 2010/0237854 A1 | 9/2010 | Kumhyr et al. |
| 2010/0262481 A1 | 10/2010 | Baker et al. |
| 2011/0060641 A1 | 3/2011 | Grossman et al. |
| 2011/0067520 A1 | 3/2011 | Ihrke et al. |
| 2011/0235853 A1 | 9/2011 | Bowles et al. |
| 2012/0016518 A1 | 1/2012 | Saario et al. |
| 2012/0029985 A1 | 2/2012 | Wilson et al. |
| 2012/0030097 A1 | 2/2012 | Hagan et al. |
| 2012/0054113 A1 | 3/2012 | Jayaraman et al. |

(56) References Cited

U.S. PATENT DOCUMENTS

| | | |
|---|---|---|
| 2012/0078413 A1 | 3/2012 | Baker et al. |
| 2012/0117001 A1 | 5/2012 | Gventer et al. |
| 2012/0146956 A1 | 6/2012 | Jenkinson et al. |
| 2012/0191562 A1 | 7/2012 | Bowles et al. |
| 2012/0254046 A1 | 10/2012 | Librizzi et al. |
| 2012/0280934 A1 | 11/2012 | Ha et al. |
| 2012/0301009 A1 | 11/2012 | Dabic |
| 2013/0046611 A1 | 2/2013 | Bowles et al. |
| 2013/0046699 A1 | 2/2013 | Bowles et al. |
| 2013/0124426 A1 | 5/2013 | Bowles et al. |
| 2013/0126741 A1 | 5/2013 | Srivastava et al. |
| 2013/0144797 A1 | 6/2013 | Bowles et al. |
| 2013/0173434 A1 | 7/2013 | Hartman |
| 2013/0191236 A1* | 7/2013 | Bowles .................. G06Q 10/30 705/26.3 |
| 2013/0198089 A1 | 8/2013 | Bowles et al. |
| 2013/0198144 A1 | 8/2013 | Bowles |
| 2013/0226679 A1 | 8/2013 | Bowles |
| 2013/0253700 A1 | 9/2013 | Carson et al. |
| 2013/0275314 A1 | 10/2013 | Bowles |
| 2013/0284805 A1 | 10/2013 | Kraft et al. |
| 2013/0290146 A1 | 10/2013 | West et al. |
| 2013/0297388 A1 | 11/2013 | Kyle et al. |
| 2014/0012643 A1 | 1/2014 | Behrisch et al. |
| 2014/0067710 A1 | 3/2014 | Gventer et al. |
| 2014/0080550 A1 | 3/2014 | Ino et al. |
| 2014/0143161 A1 | 5/2014 | Ahn et al. |
| 2014/0156883 A1 | 6/2014 | Bowles et al. |
| 2014/0214505 A1 | 7/2014 | Shuster-Arechiga et al. |
| 2015/0066677 A1 | 3/2015 | Bowles et al. |
| 2016/0328684 A1 | 11/2016 | Bowles et al. |
| 2018/0130136 A1 | 5/2018 | Bowles et al. |
| 2018/0247280 A1 | 8/2018 | Bowles et al. |
| 2018/0260794 A1 | 9/2018 | Bowles et al. |

FOREIGN PATENT DOCUMENTS

| | | |
|---|---|---|
| CN | 1864088 | 11/2006 |
| CN | 1957320 | 5/2007 |
| CN | 200965706 A | 10/2007 |
| CN | 102246384 | 11/2011 |
| CN | 202351953 U | 7/2012 |
| CN | 202394296 U | 8/2012 |
| CN | 102654927 A | 9/2012 |
| CN | 102812500 | 12/2012 |
| CN | 102930642 A | 2/2013 |
| CN | 102976004 A | 3/2013 |
| CN | 103198562 A | 7/2013 |
| CN | 103226870 A | 7/2013 |
| CN | 203242065 U | 10/2013 |
| CN | 103440607 A | 12/2013 |
| CN | 103544772 A | 1/2014 |
| CN | 203408902 U | 1/2014 |
| CN | 103662541 A | 3/2014 |
| CN | 103679147 A | 3/2014 |
| CN | 203588366 U | 5/2014 |
| EP | 1168253 A1 | 1/2002 |
| EP | 1703436 A2 | 9/2006 |
| JP | 07112801 A | 5/1995 |
| JP | H07334583 A | 12/1995 |
| JP | H11-242005 A | 9/1999 |
| JP | 2000121564 A | 4/2000 |
| JP | 2000171409 | 6/2000 |
| JP | 2002019147 A | 1/2002 |
| JP | 2002183286 A | 6/2002 |
| JP | 2002259528 A | 9/2002 |
| JP | 2002302252 A | 10/2002 |
| JP | 2002324264 A | 11/2002 |
| JP | 2002358354 A | 12/2002 |
| JP | 2003139516 | 5/2003 |
| JP | 2003230229 | 8/2003 |
| JP | 2003242243 A | 8/2003 |
| JP | 2003264007 A | 9/2003 |
| JP | 2003267509 A | 9/2003 |
| JP | 2004021569 A | 1/2004 |
| JP | 2004288143 A | 10/2004 |
| JP | 2004303102 A | 10/2004 |
| JP | 2004341681 A | 12/2004 |
| JP | 2006127308 A | 5/2006 |
| JP | 2006195814 A | 7/2006 |
| JP | 2006227764 A | 8/2006 |
| JP | 2006260246 A | 9/2006 |
| JP | 2007086725 A | 4/2007 |
| JP | 2007141266 A | 6/2007 |
| JP | 2007155455 | 6/2007 |
| JP | 2007179516 A | 7/2007 |
| JP | 2007265340 A | 10/2007 |
| JP | 2008522299 A | 6/2008 |
| JP | 2008293391 A | 12/2008 |
| JP | 2009245058 A | 10/2009 |
| JP | 2009250971 | 10/2009 |
| JP | 2010177720 A | 8/2010 |
| JP | 2012058932 A | 3/2012 |
| JP | 2013033361 A | 2/2013 |
| JP | 2013037441 A | 2/2013 |
| JP | 2013531823 | 8/2013 |
| KR | 20000064168 A | 11/2000 |
| KR | 20010097567 A | 11/2001 |
| KR | 100766860 B1 | 10/2007 |
| KR | 20140037543 A | 3/2014 |
| KR | 20130085255 A | 1/2015 |
| WO | 0115096 A1 | 3/2001 |
| WO | 0205176 A1 | 1/2002 |
| WO | 0239357 A1 | 5/2002 |
| WO | 03012717 A1 | 2/2003 |
| WO | 03014994 A1 | 2/2003 |
| WO | 2004021114 A2 | 3/2004 |
| WO | 2004114490 A1 | 12/2004 |
| WO | 2005008566 A1 | 1/2005 |
| WO | 2005101346 A1 | 10/2005 |
| WO | 2006058601 A1 | 6/2006 |
| WO | 2006080851 A2 | 8/2006 |
| WO | 2009128173 | 10/2009 |
| WO | 2009128176 A1 | 10/2009 |
| WO | 2009129526 A1 | 10/2009 |
| WO | 2010040116 A1 | 4/2010 |
| WO | 2010128267 A1 | 11/2010 |
| WO | 2010128315 A1 | 11/2010 |
| WO | 2011115857 | 9/2011 |
| WO | 2011131016 A1 | 10/2011 |
| WO | WO-2012/138679 A1 | 10/2012 |
| WO | 2013074819 A1 | 5/2013 |

OTHER PUBLICATIONS

Office Action dated Nov. 2, 2017 in U.S. Appl. No. 13/794,816, 75 pages.
Office Action dated Feb. 1, 2018 in U.S. Appl. No. 15/630,460, 24 pages.
Notice of Allowance dated Sep. 27, 2017 in U.S. Appl. No. 15/641,122, 5 pages.
Office Action dated Sep. 1, 2017 in U.S. Appl. No. 15/630,460, 23 pages.
Office Action dated Sep. 5, 2017 in U.S. Appl. No. 15/641,122, 7 pages.
Office Action dated Sep. 1, 2017 in U.S. Appl. No. 15/641,145, 20 pages.
Office Action dated Oct. 10, 2017 in U.S. Appl. No. 15/672,157, 18 pages.
2006 Florida Statutes Title XXXIII, Chapter 538, Sections 538.03 and 538.04, 7 pages.
Aftermarket Cellular Accessories, "Cellular Phone Model Identification," retrieved from http://web/archive.org/web/20060328064957/http://aftermarketcellular.com/ic/identification.html on Mar. 16, 2014, published Mar. 28, 2006, 3 pages.
Bussiness Wire, "The World's First Office Photography Machine" at CES 2008 Launched by Ortery Technologies, Jan. 7, 2008, 3 pages.
CNET, "Tackling LCD "burn ins", and dead-stick Pixels", published Sep. 2, 2009, retrieved from http://www.cnet.com/news/tackling-lcd-burn-ins-and-deadstuck-pixels/.

(56) References Cited

OTHER PUBLICATIONS

Co-Pending U.S. Appl. No. 14/498,763, filed Sep. 26, 2014.
Co-Pending U.S. Appl. No. 14/500,739, filed Sep. 29, 2014.
Co-Pending U.S. Appl. No. 14/506,449, filed Oct. 3, 2014.
Co-Pending U.S. Appl. No. 14/568,051, filed Dec. 11, 2014.
Geekanoids, You Tube Video, "Apple iPhone 3GS Unboxing and Review", uploaded on Jun. 19, 2009, retrieved from http://www.youtube.com/watch?v=GCEi9QAeDqk on Sep. 2, 2009.
Lambert, Emily, "Use It Up, Wear It Out", Forbes 175.5 (2005): 77-78. Business Source Complete. Web. Jan. 6, 2015, 3 pages.
Littleton Partners with Donations Ink (Jan. 19, 2006) US Fed News Service, Including US State News. Web. Jan. 6, 2015, 1 page.
MobileGazette.com, "2006 in Review: The Good, the Bad and the Ugly", published Dec. 2006, retrieved from http://www.mobilegazette.com/2006-review-06x12x22.htm on Nov. 11, 2015.
PC World, "Wipe Your Cell Phone's Memory Before Giving it Away", published Jan. 2006, retrieved from http://www.washingtonpost.com/wp-dyn/content/article/2006/01/30/AR2006013001144.html on Nov. 10, 2015.
Rawson, Chris, "TUAW: 25 Ways to Check the Hardware on Your iPhone 4", published Aug. 12, 2010, retrieved at http://www.tuaw.com/2010/08/13/hardware-test-your-iphone-4/ on Feb. 28, 2014.
Rehg et al., Vision for a Smart Kiosk, 1997 IEEE Computer Society Conference on Computer Vision and Pattern Recognition.
Rolf Steinhilper. "Remanufacturing: The Ultimate Form of Recycling", Fraunhofer IRB Verlag, 1998, parts 1-3, http:// www.reman.org/Publications_main.htm.
SimplySellular, "Get Cash for your Old Cell Phone", published Apr. 2, 2010, retrieved from http://simplysellular.com/conditions.php on Jan. 6, 2015, 2 pages.
Wilson, Doug, "Liquid Crystal Display (LCD) Inspection System", National Instruments Case Study, available May 10, 2009, retrieved from http://sine.ni.com/cs/app/cod/p/id/cs-345 on Jan. 5, 2015, 2 pages.
Yahoo Answers, "What is a Clean ESN?" published Jun. 23, 2009, retrieved from http://web.archive.org/web/20090623215042/http://answers.yahoo.com/question/inde,8020US?qid=20080318061012AANFRco on Apr. 3, 2014.
Altec Lansing User's Guide 2007, 8 pages.
Evgenii Masunov, Mar. 25, 2010, http://www.appleinsider.ru/news/ipone-obladaet-luchshim-tachskrinom-provereno_robotom.html, 4 pages.
International Numbering Plan, www.numberingplans.com, 2 pages.
GSM Arena Glossary, "LCD (Liquid Crystal Display", retrieved from http://www.gsmarena.com/glossary.php3?term=lcd on Apr. 28, 2016, 1 page.
Perng et al., "A Novel Vision System for CRT Panel Auto-Inspection", Proceedings of the 2005 IEEE International Conference on Mechatronics, Jul. 10-12, 2005, pp. 4.
Perng et al., "A Novel Vision System for CRT PaNnel Auto-Inspection", Journal of the Chinese Institute of Industrial Engineers, vol. 24, No. 5, pp. 341-350 (2007).
Co-Pending U.S. Appl. No. 15/630,460, filed Jun. 22, 2017.
Co-Pending U.S. Appl. No. 15/641,122, filed Jul. 3, 2017.
Co-Pending U.S. Appl. No. 15/641,145, filed Jul. 3, 2017.
Co-Pending U.S. Appl. No. 15/672,157, filed Aug. 8, 2017.
Final Office Action dated Jul. 11, 2017 in U.S. Appl. No. 13/438,924, 19 pages.
Notice of Allowance dated Jul. 13, 2017 in U.S. Appl. No. 13/792,030, 9 pages.
Notice of Allowance dated Jul. 5, 2017 in U.S. Appl. No. 13/862,395, 9 pages.
Office Action dated Apr. 9, 2014 in U.S. Appl. No. 13/862,395, 26 pages.
Office Action dated Feb. 25, 2016 in U.S. Appl. No. 13/794,816, 76 pages.
Office Action dated Jul. 11, 2016 in U.S. Appl. No. 13/794,814, 21 pages.
Office Action dated Jul. 29, 2013 in U.S. Appl. No. 13/862,395, 19 pages.
Office Action dated Mar. 3, 2017 in U.S. Appl. No. 13/913,408, 29 pages.
Office Action dated Mar. 6, 2015 in U.S. Appl. No. 13/862,395, 29 pages.
Office Action dated May 31, 2016 in U.S. Appl. No. 13/658,828, 63 pages.
Office Action dated Sep. 18, 2015 in U.S. Appl. No. 13/862,395, 29 pages.
PCT International Search Report for PCT Application No. PCT/2009/059461, filed Oct. 2, 2009.
PCT International Search Report for PCT Application No. PCT/2011/028251, filed 13/03/2011.
PCT International Search Report and Written Opinion dated Jul. 18, 2014 for PCT Application No. PCT/US2014/024551, filed Mar. 12, 2014, 11 pages.
PCT International Search Report and Written Opinion dated Apr. 3, 2014 for PCT Application No. PCT/US2013/072697, filed Dec. 2, 2013, 7 pages.
PCT International Search Report for PCT Application No. PCT/US2012/032042, filed Apr. 4, 2012.
PCT International Search Report for PCT Application No. PCT/US2012/061587, filed Oct. 24, 2012.
PCT International Search Report for PCT Application No. PCT/US2013/023717, filed Jan. 30, 2013.
RMS Communications Group, "RMS Communications Group Inc. opens cell phone kiosk at Ocean City Mall in Toms River, N.J.", retrieved from http://www.prweb.com/releases/2004/11/prweb177351.htm, Nov. 12, 2004, 2 pages.

\* cited by examiner

KIOSKS FOR EVALUATING AND PURCHASING USED ELECTRONIC DEVICES AND RELATED TECHNOLOGY

APPLICATIONS INCORPORATED BY REFERENCE

The following patents and patent applications are incorporated herein by reference in their entireties:

U.S. Provisional Application No. 61/102,304, titled "SECONDARY MARKET AND VENDING SYSTEM FOR DEVICES," filed on Oct. 2, 2008;

U.S. Provisional Application No. 61/183,510, titled "SECONDARY MARKET AND VENDING SYSTEM FOR DEVICES," filed on Jun. 2, 2009;

U.S. patent application Ser. No. 12/573,089, titled "SECONDARY MARKET AND VENDING SYSTEM FOR DEVICES," now U.S. Pat. No. 8,195,511, filed on Oct. 2, 2009;

U.S. patent application Ser. No. 13/487,299, titled "SECONDARY MARKET AND VENDING SYSTEM FOR DEVICES," now U.S. Pat. No. 8,463,646, filed on Jun. 4, 2012;

PCT Patent Application No. PCT/US2009/059461, titled "SECONDARY MARKET AND VENDING SYSTEM FOR DEVICES," filed on Oct. 2, 2009;

U.S. patent application Ser. No. 12/727,624, titled "SECONDARY MARKET AND VENDING SYSTEM FOR DEVICES," now U.S. Pat. No. 7,881,965, filed on Mar. 19, 2010;

U.S. patent application Ser. No. 13/017,560 titled "SECONDARY MARKET AND VENDING SYSTEM FOR DEVICES," now U.S. Pat. No. 8,239,262, filed on Jan. 31, 2011;

U.S. patent application Ser. No. 13/562,292, titled "SECONDARY MARKET AND VENDING SYSTEM FOR DEVICES," now U.S. Pat. No. 8,423,404, filed on Jul. 30, 2012;

PCT Patent Application No. PCT/US2011/028251, titled "APPARATUS AND METHOD FOR RECYCLING MOBILE PHONES, filed on Mar. 13, 2011;

U.S. Provisional Application No. 61/347,635, titled "SECONDARY MARKET AND VENDING SYSTEM FOR PRINTER CARTRIDGES," filed on May 24, 2010;

U.S. patent application Ser. No. 13/113,497, titled "SECONDARY MARKET AND VENDING SYSTEM FOR PRINTER CARTRIDGES," filed on May 23, 2011;

U.S. patent application Ser. No. 12/785,465, titled "APPARATUS AND METHOD FOR RECYCLING MOBILE PHONES," now U.S. Pat. No. 8,200,533, filed on May 23, 2010;

U.S. patent application Ser. No. 13/492,835, titled "APPARATUS AND METHOD FOR RECYCLING MOBILE PHONES," filed on Jun. 9, 2012;

U.S. Provisional Application No. 61/472,611, titled "METHOD AND APPARATUS FOR RECYCLING MOBILE PHONES," filed on Apr. 6, 2011;

U.S. patent application Ser. No. 13/438,924, titled "KIOSK FOR RECYCLING ELECTRONIC DEVICES," filed on Apr. 4, 2012;

PCT Patent Application No. PCT/US2012/032042, titled "METHOD AND KIOSK FOR RECYCLING ELECTRONIC DEVICES," filed Apr. 4, 2012;

U.S. Provisional Application No. 61/593,358, titled "APPARATUS AND METHOD FOR RECYCLING ELECTRONIC DEVICES," filed on Feb. 1, 2012;

U.S. Provisional Application No. 61/607,572, titled "APPARATUS AND METHOD FOR DETECTING FAKE MOBILE PHONES," filed on Mar. 6, 2012;

U.S. Provisional Application No. 61/607,548, titled "APPARATUS AND METHOD FOR RECYCLING ELECTRONIC DEVICES," filed on Mar. 6, 2012;

U.S. patent application Ser. No. 13/753,539, titled "METHOD AND APPARATUS FOR RECYCLING ELECTRONIC DEVICES," filed on Jan. 30, 2013;

PCT Patent Application No. PCT/US2013/023717, titled "METHOD AND APPARATUS FOR RECYCLING ELECTRONIC DEVICES," filed on Jan. 30, 2013;

U.S. Provisional Application No. 61/551,410, titled "METHOD AND APPARATUS FOR RECYCLING ELECTRONIC DEVICES," filed on Oct. 25, 2011;

U.S. Provisional Application No. 61/606,997, titled "METHOD AND APPARATUS FOR RECYCLING ELECTRONIC DEVICES," filed on Mar. 6, 2012;

U.S. patent application Ser. No. 13/658,825, titled "METHOD AND APPARATUS FOR RECYCLING ELECTRONIC DEVICES," filed on Oct. 24, 2012;

PCT Patent Application No. PCT/US2012/061587, titled "METHOD AND APPARATUS FOR RECYCLING ELECTRONIC DEVICES," filed Oct. 24, 2012;

U.S. Provisional Application No. 61/583,232, titled "APPARATUS AND METHOD FOR RECYCLING ELECTRONIC DEVICES," filed on Jan. 5, 2012;

U.S. Provisional Application No. 61/607,001, titled "APPARATUS AND METHOD FOR RECYCLING ELECTRONIC DEVICES," filed on Mar. 6, 2012;

U.S. patent application Ser. No. 13/733,984, titled "METHOD AND APPARATUS FOR RECYCLING ELECTRONIC DEVICES," filed on Jan. 4, 2013;

U.S. Provisional Application No. 61/570,309, titled "PRE-ACQUISITION AUCTION FOR RECYCLED ELECTRONIC DEVICES," filed on Dec. 14, 2011;

U.S. Provisional Application No. 61/595,154, titled "PRE-ACQUISITION AUCTION FOR RECYCLED ELECTRONIC DEVICES," filed on Feb. 6, 2012;

U.S. patent application Ser. No. 13/705,252, titled "PRE-ACQUISITION AUCTION FOR RECYCLED ELECTRONIC DEVICES," filed on Dec. 5, 2012;

U.S. patent application Ser. No. 13/658,828, filed "METHOD AND APPARATUS FOR RECYCLING ELECTRONIC DEVICES," filed on Oct. 24, 2012;

U.S. patent application Ser. No. 13/693,032, titled "METHOD AND APPARATUS REMOVING DATA FROM A RECYCLED ELECTRONIC DEVICE," filed on Dec. 3, 2012;

U.S. patent application Ser. No. 13/792,030, titled "MINI-KIOSK FOR RECYCLING ELECTRONIC DEVICES," filed on Mar. 9, 2013;

U.S. patent application Ser. No. 13/794,814, titled "METHOD AND SYSTEM FOR REMOVING AND TRANSFERRING DATA FROM A RECYCLED ELECTRONIC DEVICE," filed on Mar. 12, 2013; and U.S. patent application Ser. No. 13/794,816, titled "METHOD AND SYSTEM FOR RECYCLING ELECTRONIC DEVICES IN COMPLIANCE WITH SECOND HAND DEALER LAWS," filed on Mar. 12, 2013.

TECHNICAL FIELD

The present invention generally relates to recycling of electronic devices.

BACKGROUND

There has been a large increase in the number of electronic devices used by the typical consumer. These devices include cell phones, PDA's, MP3 players, GPS devices, cameras, beepers, remote controls, cordless phones, calculators, etc. The rapid pace at which new technology and models of electronic devices are introduced creates a situation where many consumers upgrade or replace one or more recyclable device on a frequent basis. Often, the consumer does not dispose of the prior electronic device, but rather just stops using it and begins using the new device. This may happen over several generations of such devices.

In addition to the electronic devices mentioned above, there are many other types of devices that have relatively high frequency replacement rates, including portable mobile electronic devices, such as cell phones, MP3 players, etc., and non-portable electronic devices, such as computers, printers, and the like. In addition to electronic devices, there are content based digital media such as games on CD, DVD, or cartridge, or entertainment mass storage items such as CDs, DVDs, BluRay, etc. There is a need for handling of such items in an ecologically friendly manner, both via recycling or by proper disposal procedures. It has not been convenient for owners of electronic devices to either recycle such devices or to properly dispose of such devices. There is currently little incentive for a device owner to "do the right thing" with a used device. When the owner just stops using a device and simply puts it in storage: the opportunity for recycling or re-use by another party is lost. If the owner just throws the device away in normal trash containers, the proper recycling or safe disposing of the device is thwarted.

One particular problem associated with this phenomenon can be illustrated by an example of mobile phones. There are more than 3.6 billion mobile phone users in the world with an annual growth of 10% per annum. The replacement rate of mobile handsets is roughly every 18 months as new models have more features and new standards evolve. Wireless carriers also offer new phones below cost, or free, as incentives to get customers to sign lucrative two-year service contracts ensuring a constant build-up of old mobile phones. Old mobile phones and other mobile devices (pagers, PDAs) present a growing threat to the environment. As of 2007, there are more than 750 million mobile phones waiting to be recycled in the US, either in drawers or already in the waste stream. Another 150+ million or so are added every year. Once in the waste stream, these devices may leak Lead, Mercury, Cadmium, Arsenic and other toxic substances into the water supply. Municipalities often incinerate their waste, instantly putting these toxic elements into the air, and they return to earth in rain water. A problem that needs to be solved is to make it easy and accessible for the public to recycle or resell their mobile phones and other recyclable devices. Two reasons why mobile phones are not being recycled or resold are difficult access to recycling or reselling facilities, and secondly security concerns about the information stored on the mobile phone. In addition to mobile phones, the same problems apply to many other electronic devices.

Technology has not yet provided a resolution to this problem. One invention is Bishop, U.S. Pat. No. 4,951,308 for Automated Vending Of Cellular Hand-Held Telephones And Cellular Telephone Services, which discloses a vending machine that dispenses cellular telephones purchased by consumers through the vending machine. Bishop essentially adds to the problem by making it easier to acquire mobile phones.

Taylor et al., U.S. Patent Publication Number 2009/0190142, for a Method And System For Connecting A Data Storage Device To A Kiosk, discloses a kiosk with a docking port and an optical recognition device for identifying a data port on a data storage device. Taylor is directed at printing digital images at a photo kiosk.

The prior art has failed to recognize the problems associated with recycling electronic devices in a manner that is enticing to a consumer yet financially rewarding to the recycler. Further, the prior art has failed to determine a means for establishing a market price for an electronic device.

SUMMARY

The invention allows for a process for a pre-acquisition auction to establish a purchase price for a recycled electronic device.

One aspect of the present invention a method for analysis of a mobile communication device and financial remuneration to a user for submission of the mobile communication device. The method comprises identifying a mobile communication device, soliciting bids for a used model of the mobile communication device and receiving bids for the used model of the mobile communication device from a plurality of bidders. The method further comprises setting a purchase price to pay for the used model of the mobile communication device based on the plurality of bids received from the plurality of bidders and identifying a used model of the mobile communication device at a recycling kiosk for the mobile communication device. The method further comprises verifying the integrity of the used model of the mobile communication device at the recycling kiosk and offering the purchase price for the used model of the mobile communication device at the kiosk. Additionally, the method comprises purchasing the used model of the mobile communication device. Preferably, the method further comprises automatically binning the mobile communication device after purchasing the used model of the mobile communication device. The method may further comprise instructing the user to erase the data of the used model of the mobile communication device prior to positioning the mobile communication device in the recycling kiosk.

The kiosk of the method comprises a housing, the housing comprising a user interface on an exterior surface of the housing for the user to input information, an upper dome and a lower dome, wherein the upper dome and the lower dome comprise a plurality of mirrors. The kiosk further comprises an upper chamber camera, a lower chamber camera and a transparent surface. The kiosk further comprises a processor within the housing and in communication with the at least one camera, the processor configured to identify the brand and model number of the mobile communication device based on at least one of the information from the user and the images from the at least one camera, the processor configured to determine a purchase price for the used model of the mobile communication device.

Another aspect of the present invention is a method for analysis of an electronic device and financial remuneration to a user for submission of the electronic device. The method comprises positioning an electronic device in an inspection area of a kiosk, the inspection area having a camera. The method further comprises imaging a screen shot of a about page of the electronic device, and inspecting the screen shot of the about page of the electronic device obtained by at least one camera disposed in the inspection area to determine if the electronic device has any defects. The method further comprises determining a value for electronic device. Lastly the method comprises determining a value for the electronic device.

Yet another aspect of the present invention is a method for analysis of an electronic device and financial remuneration to a user for submission of the electronic device. The method includes positioning an electronic device on a transparent plate for automatic transport to an inspection area of a recycling kiosk, the inspection area having at least one imaging component. The method also includes inspecting the electronic device within the inspection area at a remote location by an operator, the operator inspecting the electric device for visual analysis for identification and condition of the electronic device. The method also includes transferring data from the electronic device. The method also includes determining a value for the analyzed electronic device.

An additional aspect of the present invention is a kiosk for recycling electronic devices such as mobile phones, tablet computes. e-readers, MP3 players, and the like. The kiosk preferably has a housing with a touch screen display for user interaction. The kiosk also has an inspection area defined by an upper chamber, a lower chamber and a transparent plate for transporting an electronic device into the inspection area. The upper and lower chambers preferably have mirrors on interior surfaces along with imaging components such as cameras in order to obtain multi-angled views, or even a 3-D profile, of an electronic device within the inspection area. The kiosk also preferably has a carousel with multiple different electrical connectors in order to electrically connect to an electronic device. The kiosk also preferably has a mechanism for automatically binning the electronic device. The kiosk also has a processor configured to perform visual analysis for identification of the electrical device and to determine a condition of the electronic device, especially a LCD display of the electronic device. The processor is configured to perform an electrical analysis of the electronic device. Further, the processor is configured to erase or transfer data from electronic device.

Yet another aspect of the present invention a method for analysis of a mobile communication device and financial remuneration to a user for submission of the mobile communication device. The method comprises identifying a mobile communication device, soliciting bids for a used model of the mobile communication device and receiving bids for the used model of the mobile communication device from a plurality of bidders. The method further comprises setting a purchase price to pay for the used model of the mobile communication device based on the plurality of bids received from the plurality of bidders and identifying a used model of the mobile communication device at a recycling kiosk for the mobile communication device. The method further comprises verifying the integrity of the used model of the mobile communication device at the recycling kiosk and offering the purchase price for the used model of the mobile communication device at the kiosk. Additionally, the method comprises purchasing the used model of the mobile communication device. Preferably, the method further comprises automatically binning the mobile communication device after purchasing the used model of the mobile communication device. The method may further comprise instructing the user to erase the data of the used model of the mobile communication device prior to positioning the mobile communication device in the recycling kiosk.

The kiosk of the method comprises a housing, the housing comprising a user interface on an exterior surface of the housing for the user to input information, an upper dome and a lower dome, wherein the upper dome and the lower dome comprise a plurality of mirrors. The kiosk further comprises an upper chamber camera, a lower chamber camera and a transparent surface. The kiosk further comprises a processor within the housing and in communication with the at least one camera, the processor configured to identify the brand and model number of the mobile communication device based on at least one of the information from the user and the images from the at least one camera, the processor configured to determine a purchase price for the used model of the mobile communication device.

Yet another aspect of the present invention is a method for analysis of a mobile electronic device and financial remuneration to a user for submission of the mobile electronic device. The method includes identifying a mobile communication device and a predetermined condition of the mobile communication device. The method also includes soliciting bids for a used model of the mobile communication device in the predetermined condition. The method also includes receiving bids for the used model of the mobile communication device from a plurality of bidders. The method also includes setting a purchase price to pay for the used model of the mobile communication device based on the plurality of bids received from the plurality of bidders. The method also includes identifying a used model of the mobile communication device at a recycling kiosk for the mobile electronic device. The method also includes verifying the integrity of the used model of the mobile communication device at the recycling kiosk. The method also includes offering the purchase price for the used model of the mobile communication device at the kiosk. The method also includes purchasing the used model of the mobile communication device. The method also includes erasing or transferring data from the mobile communication device at the kiosk. The method also includes delivering the mobile communication device to a winning bidder.

Yet another aspect of the present invention is a method for analysis of a mobile electronic device and financial remuneration to a user for submission of the mobile electronic device. The method includes establishing a plurality of pre-acquisition purchase prices, each of the plurality of pre-acquisition purchase prices established for a recycled electronic device in a predetermined condition. Each of the pre-acquisition purchase prices established by a winning bid from a bidder of a plurality of bidders for a recycled electronic device. The method also includes positioning an electronic device in an inspection area of a kiosk, the inspection area having at least one camera. The method also includes imaging the electronic device. The method also includes analyzing the electronic device for identification of the electronic device and a condition of the electronic device. The method also includes erasing or transferring data from the mobile communication device at the kiosk. The method also includes selecting a matching pre-acquisition purchase price from the plurality of pre-acquisition purchase prices for the electronic device. The method also includes offering a consumer the pre-acquisition purchase price for the electronic device.

Another aspect of the present invention is a method for analysis of an electronic device and financial remuneration to a user for submission of the electronic device. The method comprises positioning an electronic device in an inspection area of a kiosk, the inspection area having a camera. The method further comprises imaging a screen shot of a about page of the electronic device, and inspecting the screen shot of the about page of the electronic device obtained by at least one camera disposed in the inspection area to determine if the electronic device has any defects. The method also includes erasing or transferring data from the mobile communication device at the kiosk. Lastly the method comprises determining a value for the electronic device.

The kiosk of the method comprises a housing, a user interface on an exterior surface of the housing for the user to input information, an upper dome and a lower dome, wherein the upper dome and the lower dome comprise a plurality of mirrors. The kiosk further comprises an upper chamber camera, a lower chamber camera and a transparent surface. The kiosk also comprises a processor within the housing and in communication with the at least one camera, the processor configured to identify the brand and model number of the electronic device based on at least one of the information from the user and the images from the at least one camera, the processor configured to determine a financial remuneration value for the electronic device. Preferably, the method further comprises comparing information derived from the barcode sticker to information derived from the about page.

In another aspect of the present invention, the invention comprises a method for analysis of an electronic device and financial remuneration to a user for submission of the electronic device. The method comprises positioning an electronic device in an inspection area of a recycling kiosk 100, wherein the inspection area has a plurality of mirrors. The method further comprises placing the electronic device in an illuminated mode wherein a LCD screen of the electronic device is illuminated to visually enhance the appearance of any defects in the LCD screen and inspecting an image of the LCD screen of the electronic device obtained by at least one camera disposed in the inspection area to determine if the LCD screen of the electronic device has any defects. The method further comprises defining an analyzed electronic device. The method also includes erasing or transferring data from the mobile communication device at the kiosk. Lastly, the method comprises determining a value for the analyzed electronic device.

In one embodiment of the present invention, the method further comprises performing an electrical analysis of the electronic device. In an alternative embodiment of the present invention, the method further comprises powering up the electronic the device. In yet another embodiment of the present invention the method further comprises measuring the luminescence from the LCD screen of the electronic device.

In one embodiment of the present invention, the method further comprises automatically binning the electronic device after a visual inspection and electrical inspection. Further, the method comprises completing the visual inspection and electrical inspection within an illumination period. The illumination period comprises the time from when the LCD of the phone is initially illuminated to the time the display screen transitions into an energy conserving mode, evidenced by the screen blacking out.

In yet another embodiment, the method comprises positioning an electronic device in an inspection area of a recycling kiosk 100, powering up the electronic device and inputting a term on the electronic device. The inputted term comprises a plurality of characters and the term is displayed on the LCD screen of the electronic device. The method further comprises inspecting an image of the LCD screen of the electronic device obtained by at least one camera disposed in the inspection area utilizing an optical character recognition program of the recycling kiosk to determine if the LCD screen of the electronic device has any defects. The term is preferably a telephone number, a word or number.

Having briefly described the present invention, the above and further objects, features and advantages thereof will be recognized by those skilled in the pertinent art from the following detailed description of the invention when taken in conjunction with the accompanying drawings.

DETAILED DESCRIPTION

The invention allows for a process for a pre-acquisition auction to establish a purchase price for a recycled electronic device. The pre-purchase auction is used in conjunction with a kiosk that uses automatic visual analysis of an electronic device to determine if the electronic device is damaged in order to ascertain a value for recycling the electronic device. The established purchase price is based on the condition of the electronic device, preferably a consumer electronic device such as a mobile phone, and the demand for such an electronic device. Thus, when a consumer goes to recycle an electronic device, the process has already established a price to be paid for the recycled electronic device.

The pre-acquisition auction identifies a recycled electronic device and a condition of the recycled electronic device. Bidders, preferably pre-qualified and online, bid on the recycled electronic device knowing that deliver of the recycled electronic device will be in the future since the recycled electronic device has not yet been acquired by the seller (the party conducting the auction) from a consumer. Once a purchase price is established, that purchase is used for purchasing the recycled electronic device from a consumer. The purchase price preferably includes a fee for the seller or costs of acquisition. Alternatively, the auction price is used as a base and a margin is added to generate a purchase price for the electronic device.

The process for a pre-acquisition auction to establish a purchase price for a recycled electronic device is preferably utilized with a system and method for analyzing an electronic device performed at a recycling kiosk.

Figure 1:
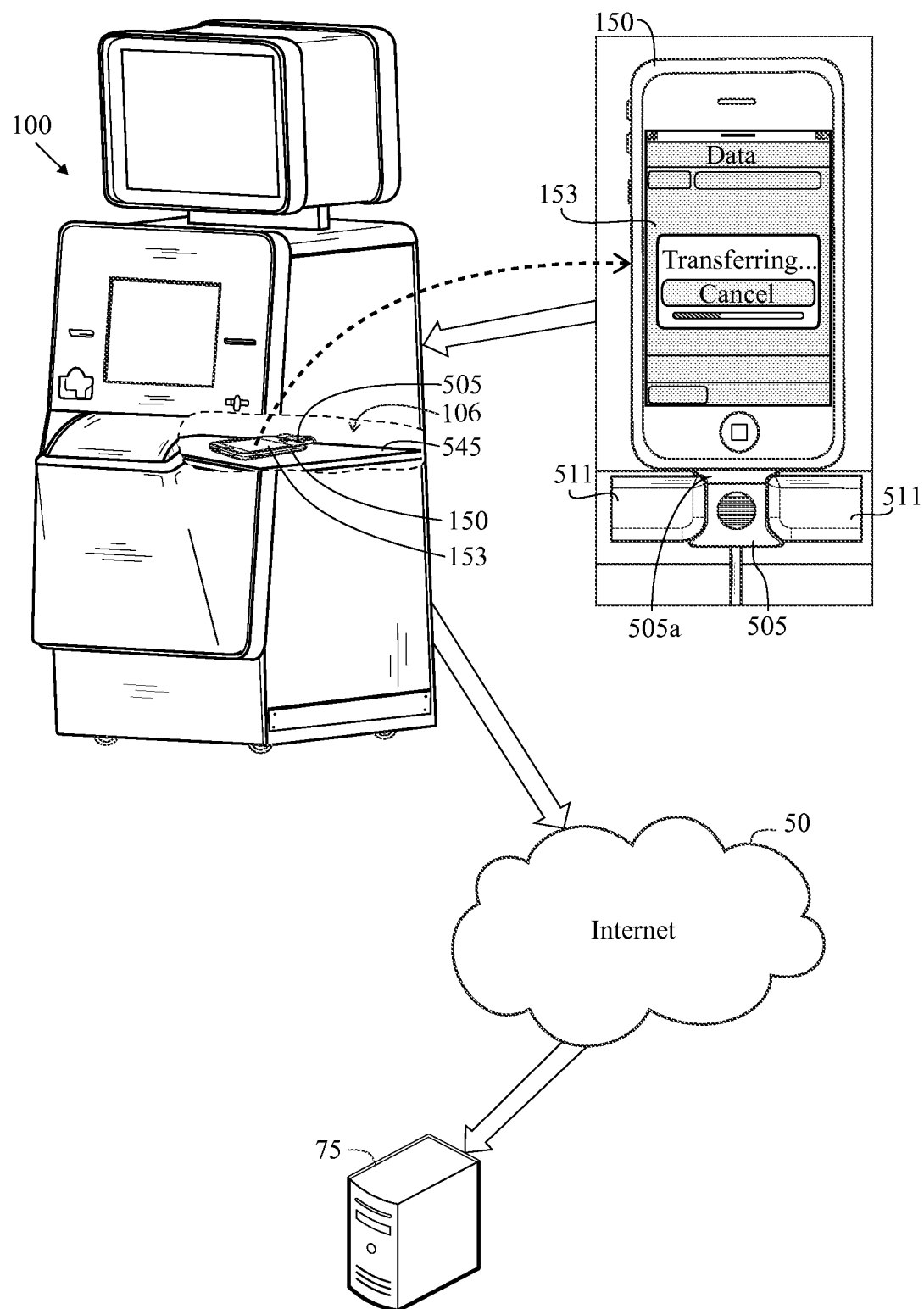
FIG. 1 is a block diagram of a system for data transfer from a recycled electronic device.
Figures 2, 3:
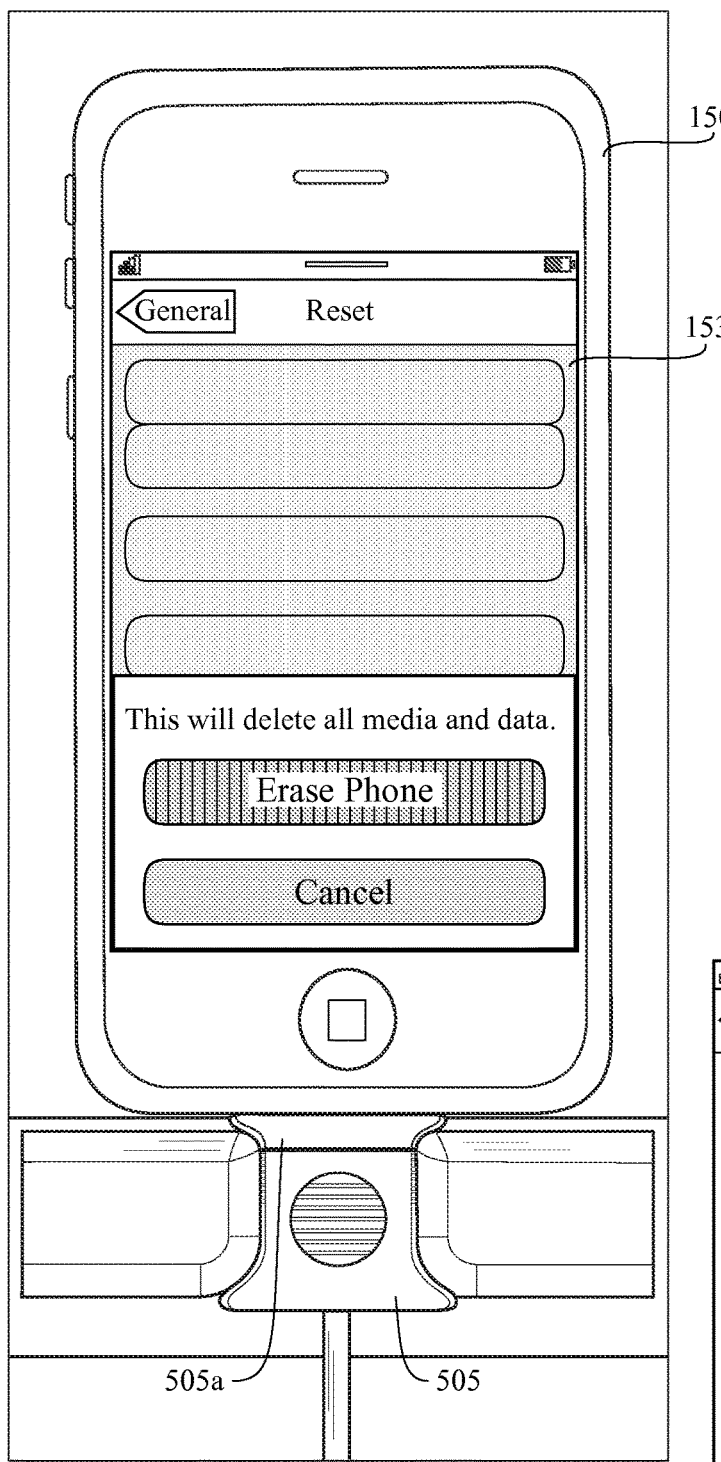
FIG. 2 is an isolated view of a mobile phone connected to an electrical connector for an erasure of data from the mobile phone.
FIG. 3 is an isolated view of data stored on the mobile phone of FIG. 2.
Figure 4:
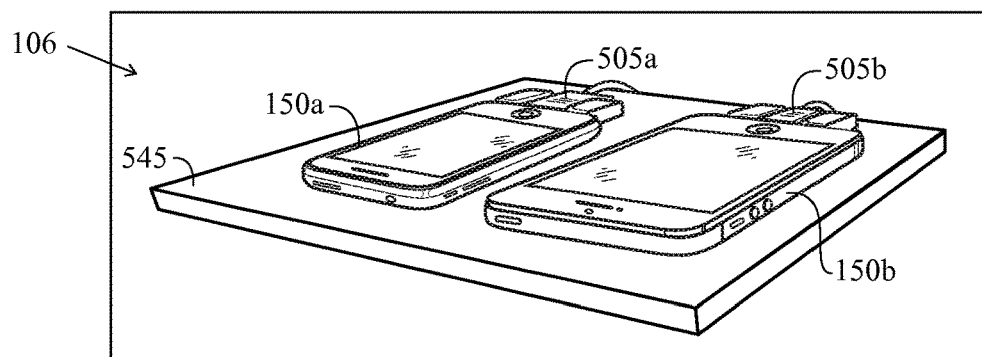
FIG. 4 is an isolated view of a transfer of data from a recycled electronic device to a new electronic device within an inspection area of a recycling kiosk.
Figure 5:
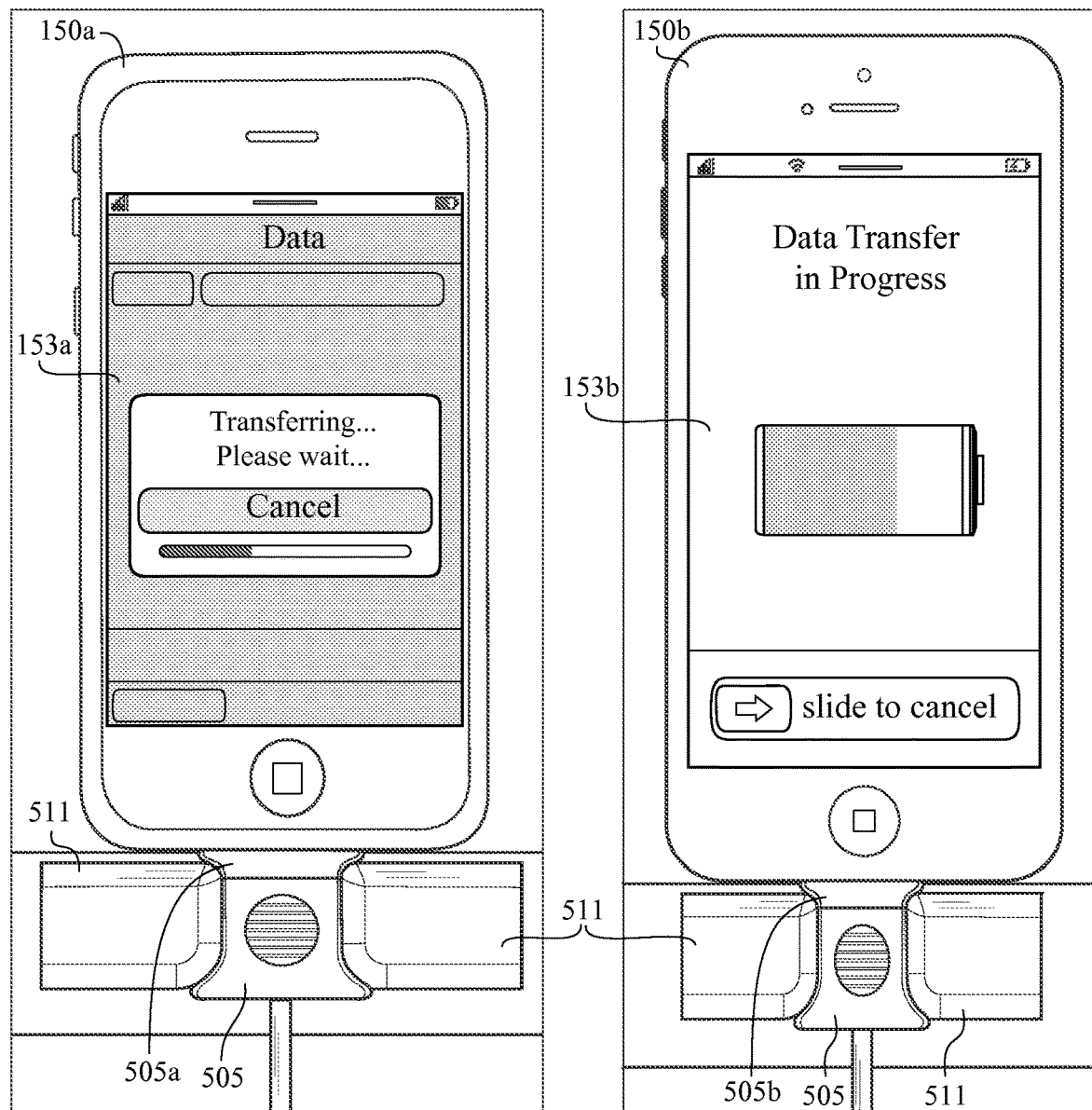
FIG. 5 is a view of a transfer of data from a recycled electronic device to a new electronic device within an inspection area of a recycling kiosk.

FIG. 1 is a block diagram of a system for data transfer from a recycled electronic device. A kiosk for recycling electronic devices and providing financial remuneration is generally designated 100. The electronic device 150 may be a Smart Phone, mobile phone, tablet computer, IPOD® device, MP3 Player, GPS device, e-reader, etc. Within an inspection area, the electronic device 150 is placed on a transparent plate 545 and connected to an electrical connector 505. Data from the electronic device 150 is either erased or transferred from the electronic device 150. If erased, as shown in FIG. 2, a processor of the kiosk 100 is configured to instruct the electronic device 150 to erase all personal data, such as shown in FIG. 3. Other data, such as operating software for the electronic device, is not erased. If the data is to be transferred, one embodiment includes a processor of the kiosk 100 configured to transfer the data from the electronic device 150, through the kiosk 100 over a network 50 to a server 75 for storage in a database for eventual retrieval by an end-user of the electronic device. In another embodiment, as shown in FIGS. 4 and 5, data is transferred from a recycled electronic device 150a to a new electronic device 150b. Both devices 150a and 150b are preferably placed on a transparent plate 545 within the inspection area 106 and connected to electrical connectors 505a and 505b respectively. The transfer is shown on the display screens 153a and 153b of the electronic devices 150a and 150b.

Figure 6:
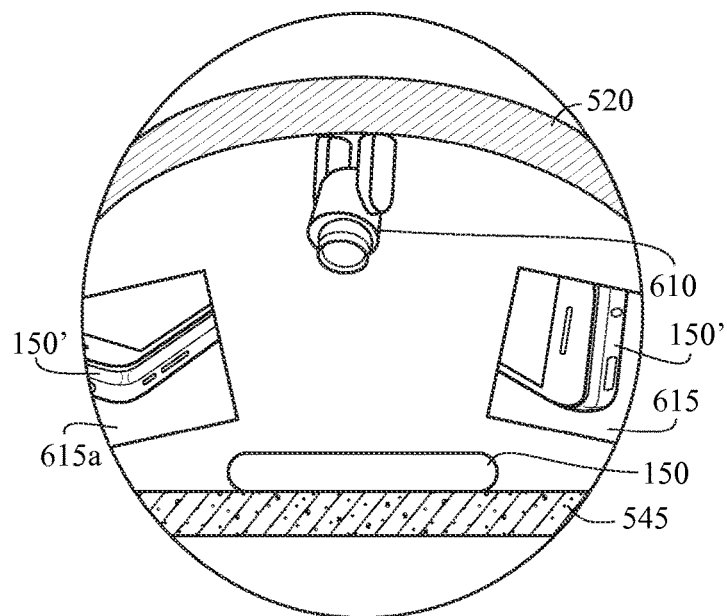
FIG. 6 is an isolated view of an imaging component within an inspection area of a recycling kiosk allowing for viewing of a mobile phone for analysis by a remote operator.
Figure 7:
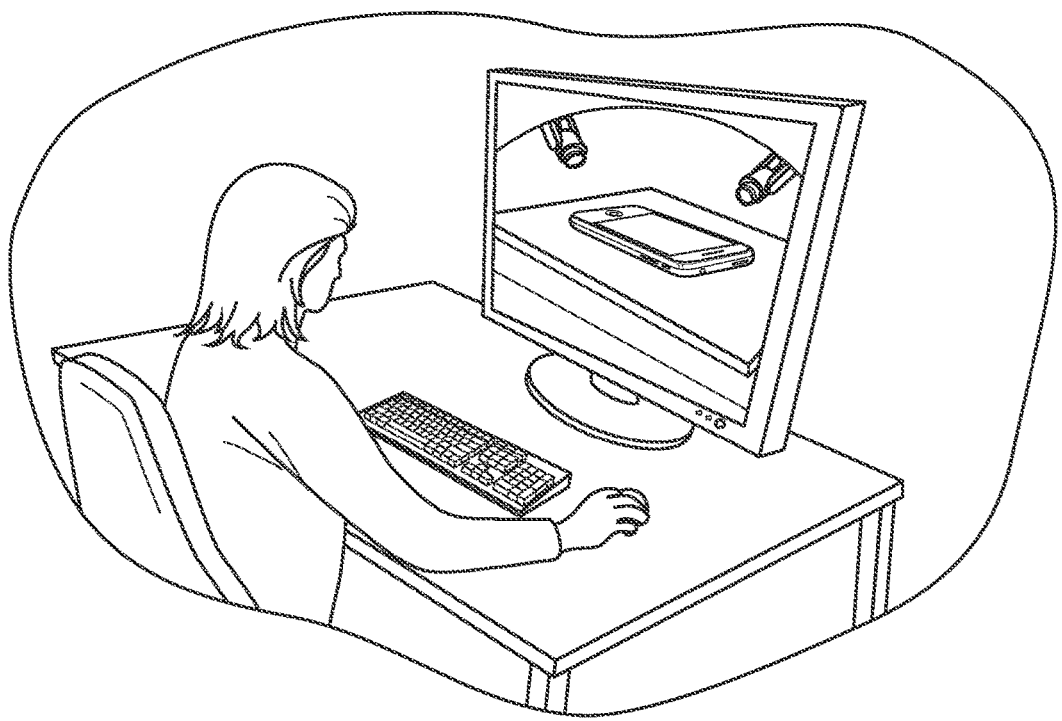
FIG. 7 is a perspective view of an operator viewing a display screen showing the image of a mobile phone within an inspection area of a recycling kiosk.
Figure 8:
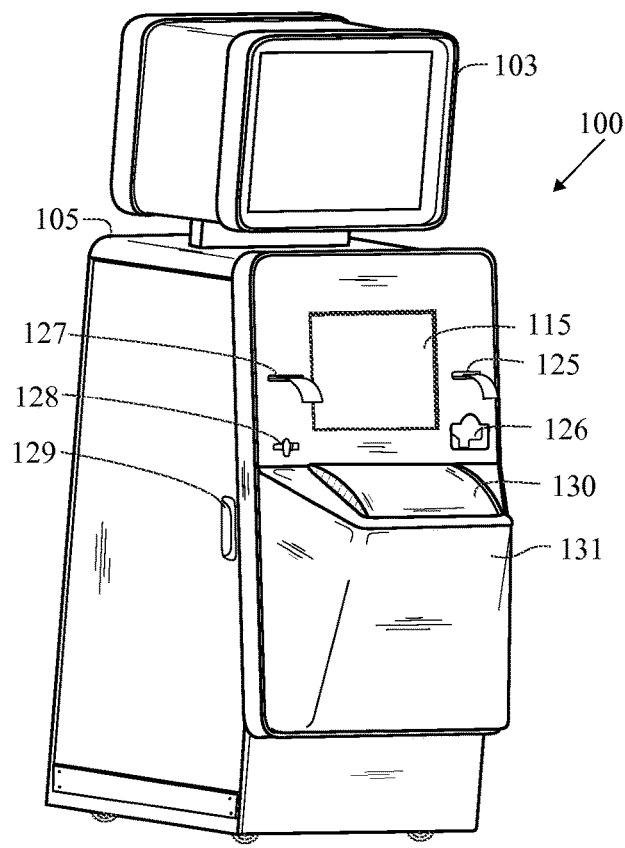
FIG. 8 is a perspective view of a recycling kiosk.
Figure 8A:
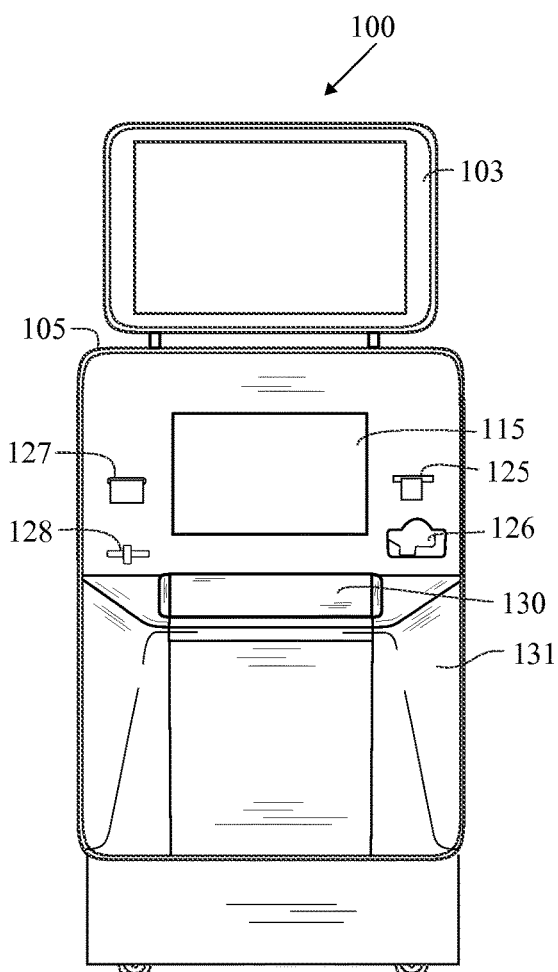
FIG. 8A is a front view of the recycling kiosk of FIG. 8.
Figure 8B:
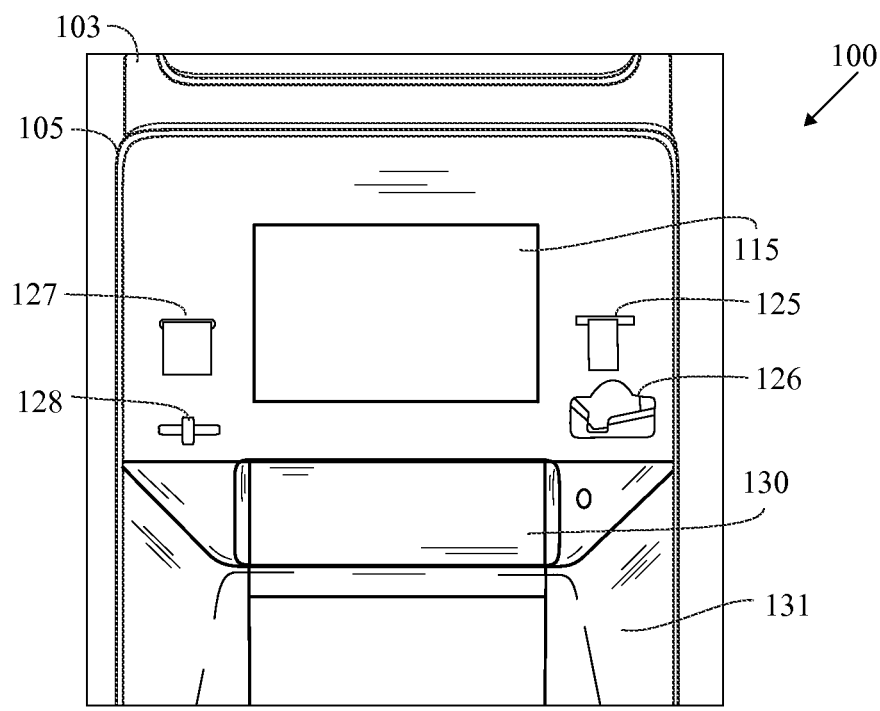
FIG. 8B is an isolated view of a front of the recycling kiosk of FIG. 8.
Figure 8C:
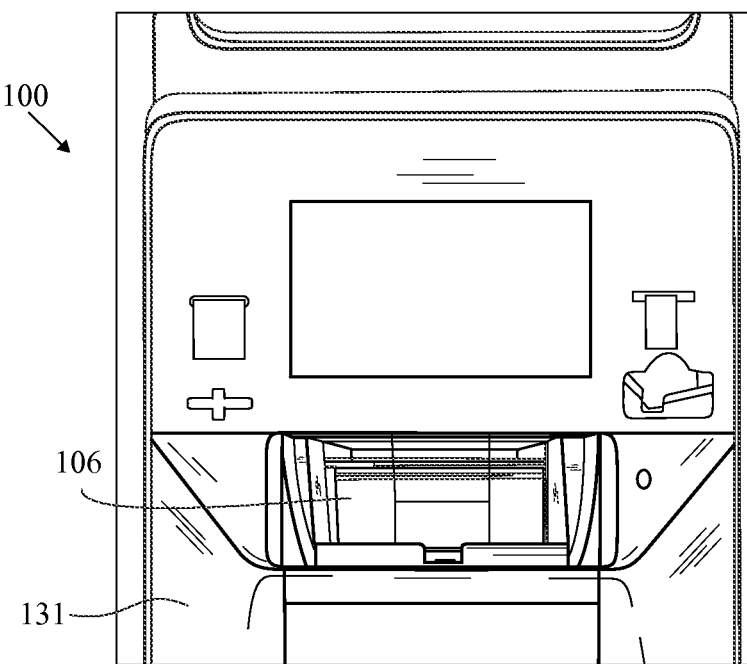
FIG. 8C is an isolated view of a front of the recycling kiosk of FIG. 8.

In yet another embodiment of the invention, as shown in FIGS. 6 and 7, an operator in a remote location visually inspects an electronic device 150 within an inspection area 106 of a kiosk 100 using at least one camera 610. The operator also receives data from an electrical analysis of the electronic device 150 as explained below. In this manner, the remote operator provides human interaction for an end-user attempting to recycle the electronic device 150.

As shown in FIGS. 8, 8A, 8B and 8C, the kiosk 100 has a housing 105 in a pseudo-rectangular cube shape. A header 103 allows for marketing and videos. An access door 130 in a front body area 131 provides access to an inspection area 106 for electronic devices. The front of the housing 105 has a display screen 115 for providing information to a user, and acts as a user interface in a touch screen embodiment. The exterior of the housing 105 also preferably has a label printer 125, a voucher dispenser 126, a receipt printer 127, and a cash or card dispenser 128. The exterior housing may also have a thumbprint reader.

The kiosk 100 allows for automatic visual analysis of an electronic device to identify the electronic device and to determine electronic device is damaged in order to ascertain a value for recycling the electronic device. Further, the kiosk 100 also allows for electrical analysis of the electronic device.

Figure 9:
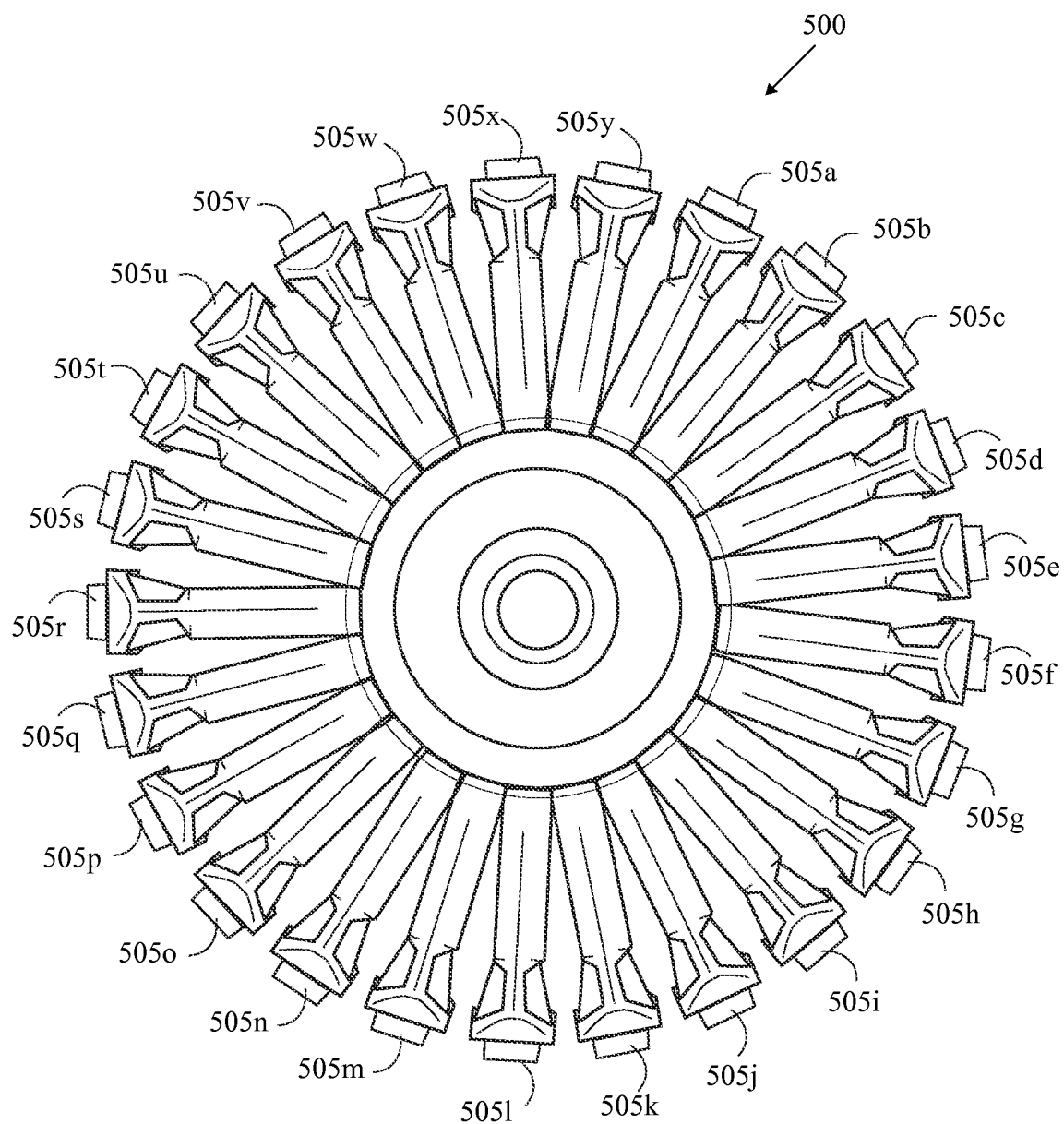
FIG. 9 is an isolated view of an electrical connector wheel.
Figure 9A:
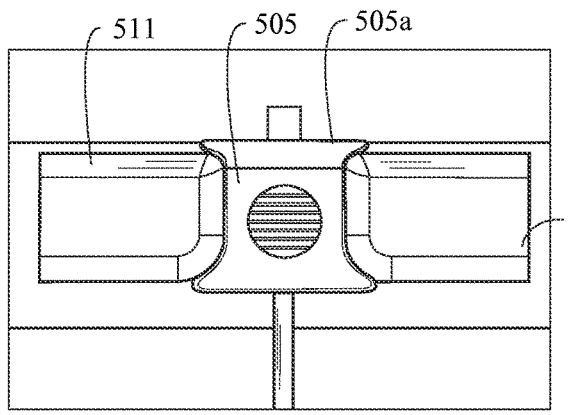
FIG. 9A is an isolated view of an electrical connector is a staging area.
Figure 9B:
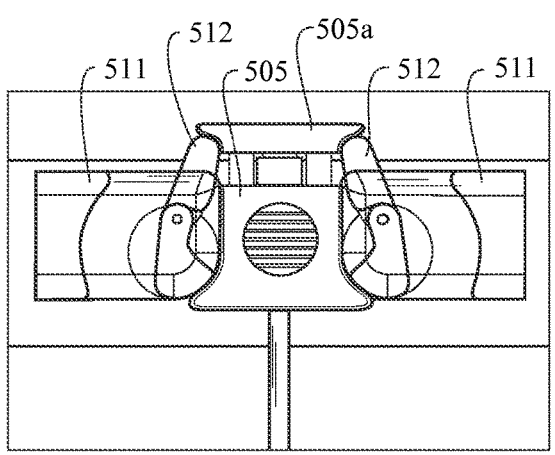
FIG. 9B is an isolated view of an electrical connector in a detached position.
Figure 9C:
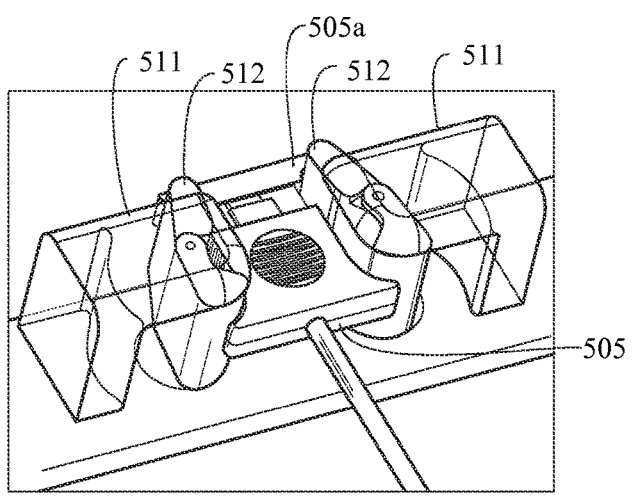
FIG. 9C is an isolated view of an electrical connector being detached.
Figure 9D:
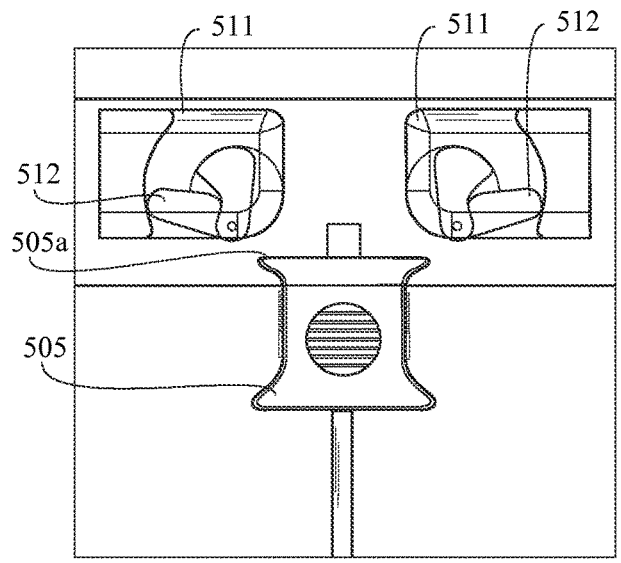
FIG. 9D is an isolated view of an electrical connector being retracted.
Figure 18:
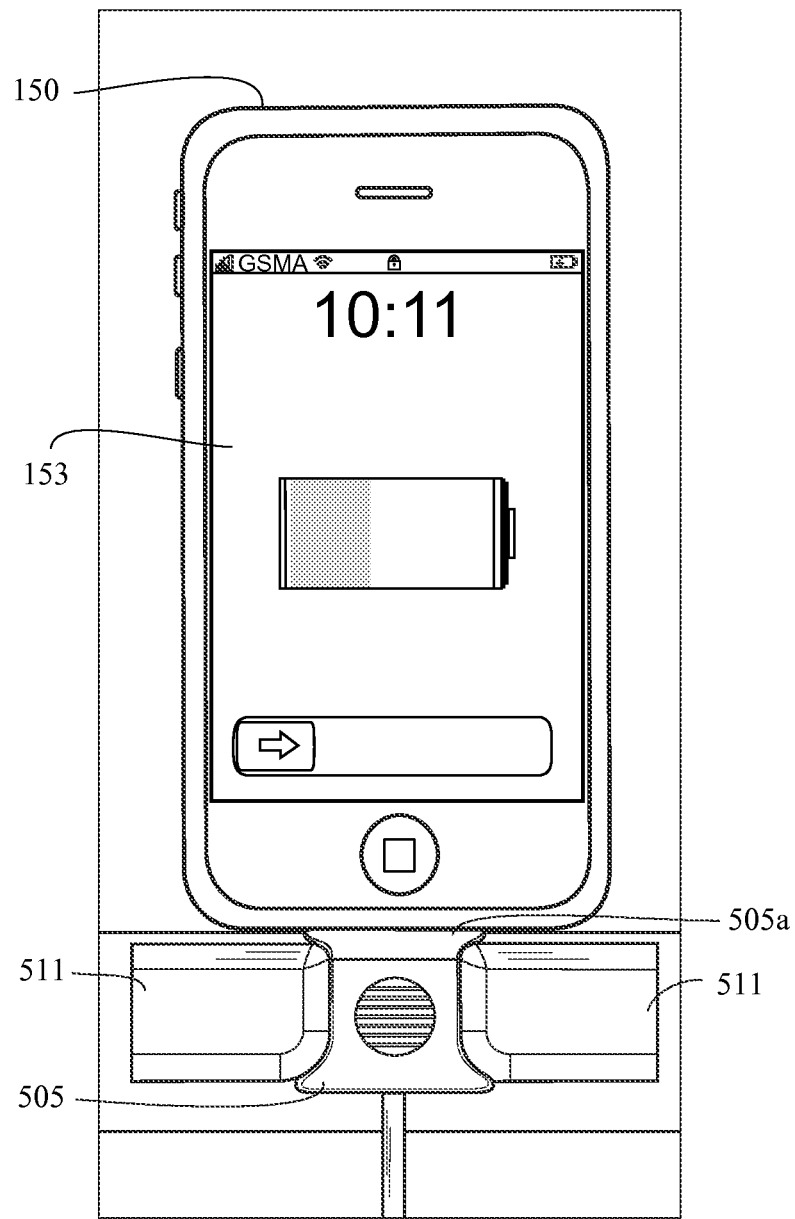
FIG. 18 is a front view of a phone connected to an electrical connector.

As shown in FIGS. 9, 9A, 9B, 9C and 9D, the kiosk 100 comprises a carousel 500 containing a plurality of electrical connectors 505a-505y. Each of the electrical connectors 505 has a unique connection plug for removable connection to an electronic device. Each of the electrical connectors 505a-505y has a cartridge removeably secured in the carousel 500. Thus, new electrical connectors 505 can be substituted for older electrical connectors 505. Further, the kiosk 100 is designed to allow for automatic removal of the electrical connector 505 using detachment mechanism 511. In FIG. 9A, the electrical connector 505 is in a staging area, where it would be connected to a port of an electrical device (as shown FIG. 18). Next, as shown in FIGS. 9B and 9C, hinged arms 512 of the detachment mechanism 511 engage a moveable member of the electrical connector 505 to force the outward movement of the moveable member and the disconnection of the electrical connector 505 from a port of an electronic device (as shown in FIG. 18). As shown in FIG. 9D, the electrical connector 505 is retracted by a cable from the detachment mechanism 511.

Figure 10:
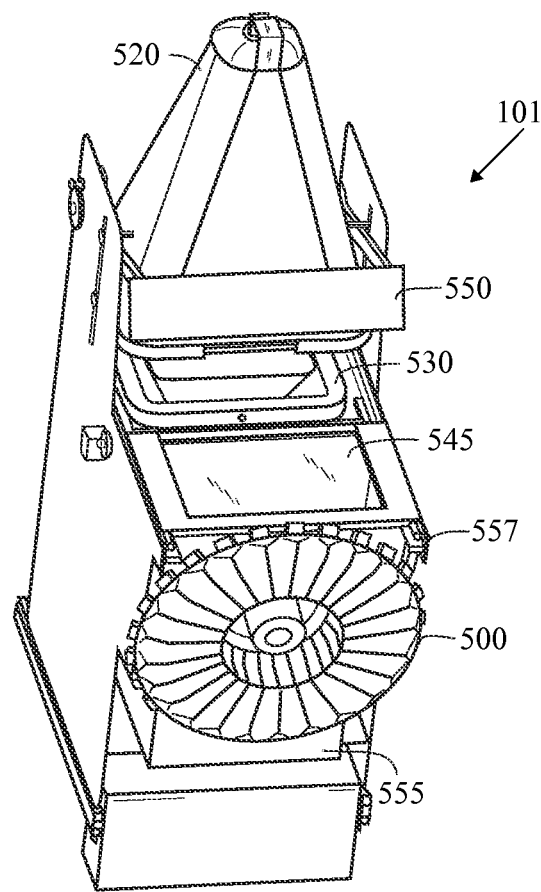
FIG. 10 is a perspective view of internal components of a kiosk.
Figure 10A:
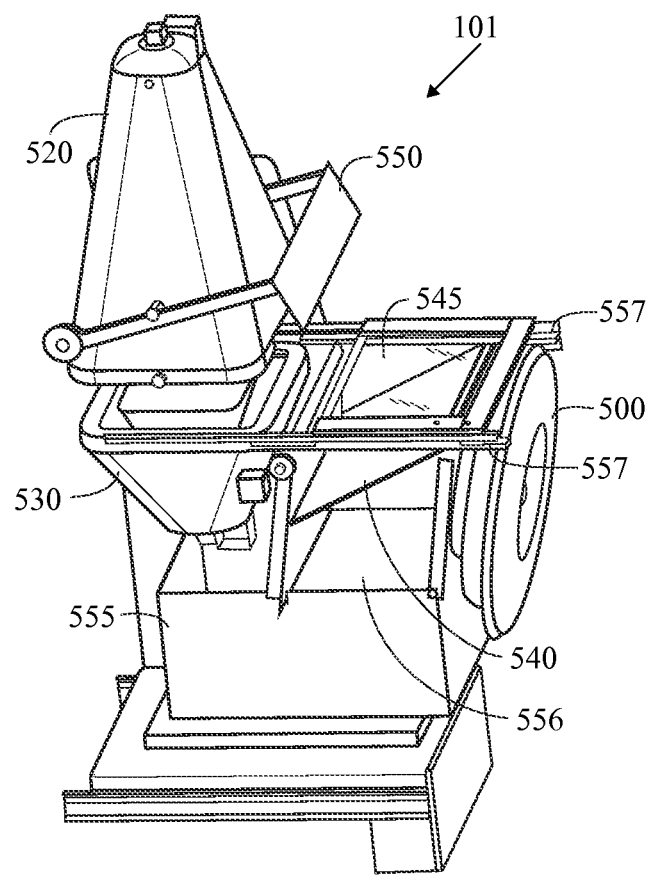
FIG. 10A is a perspective view of internal components of a kiosk.
Figure 10B:
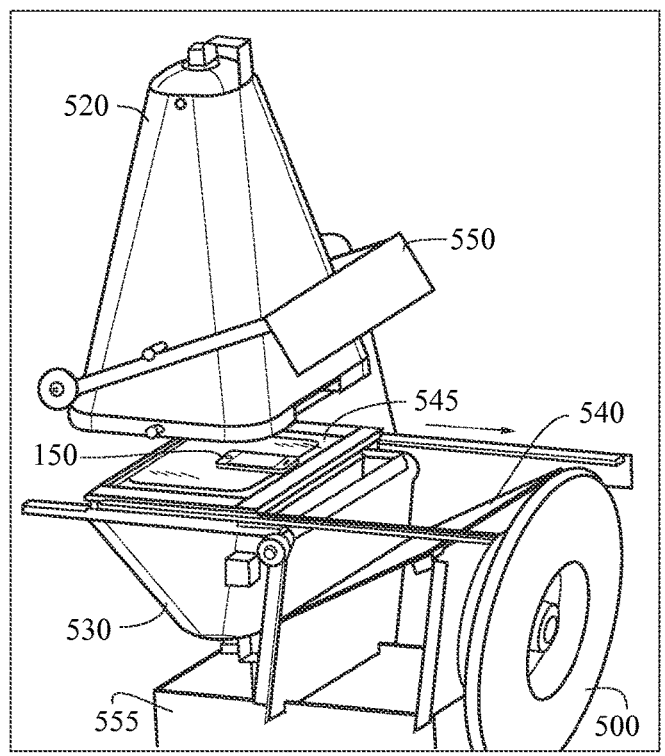
FIG. 10B is a perspective view of internal components of a kiosk.
Figure 10C:
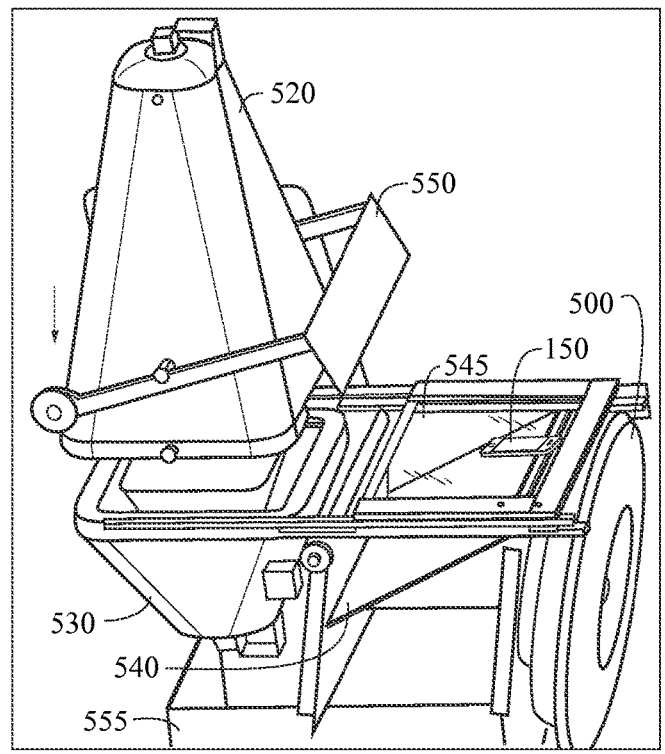
FIG. 10C is a perspective view of internal components of a kiosk.

As shown in FIGS. 10, 10A, 10B and 10C, the internal mechanism 101 of the kiosk 100 includes an upper chamber 520, a lower chamber 530, a binning plate 540, a transparent plate 545, a door 550, a bin 555 and the carousel 500. Preferably, the carousel 500 is able to hold approximately 25 electrical connectors 505, wherein the electrical connectors 505 are interchangeable to easily adapt to the variations in USB and other like connections. As shown in FIG. 10B, a mobile phone 150 is placed on the transparent plate 545 and transferred to an inspection area 106 within upper chamber 520 and lower chamber 530. Both the upper chamber and the lower chamber preferably have a bell-like shape. As shown in FIG. 10C, the mobile phone is moved between the upper chamber 520 and the lower chamber 530 for visual analysis. The transparent plate, preferably composed of glass of a transparent plastic material, allows for imaging components within the upper chamber 520 and lower chamber 530 to obtain multiple view images of the mobile phone 150. Preferably, a 3-D profile of the mobile phone is generated in order to provide visual analysis for identification and condition of the mobile phone. Once the visual analysis is complete, the transparent plate 545 moves out from between the upper chamber 520 and lower chamber 530.

Figure 11:
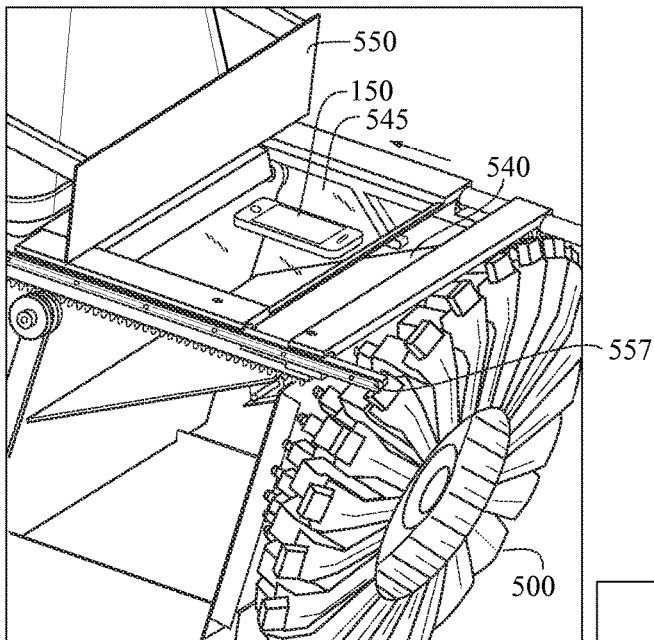
FIG. 11 is an isolated view of a phone an inspection plate of a kiosk.
Figure 11A:
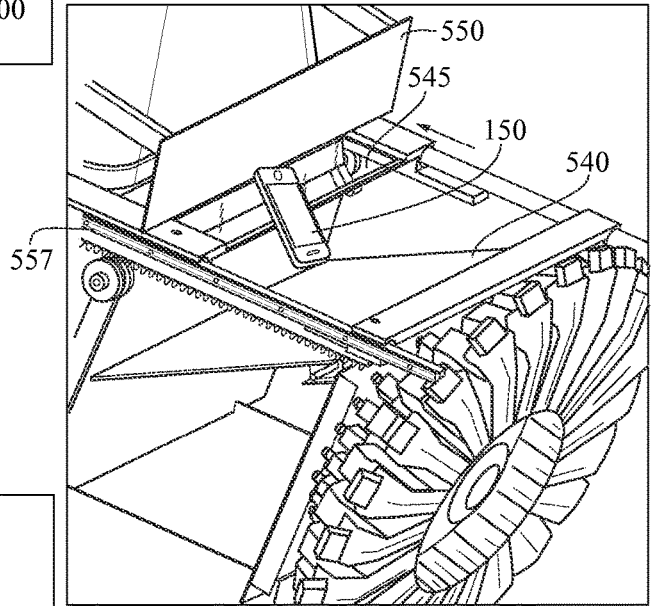
FIG. 11A is an isolated view of a phone being transferred in the kiosk.
Figure 11B:
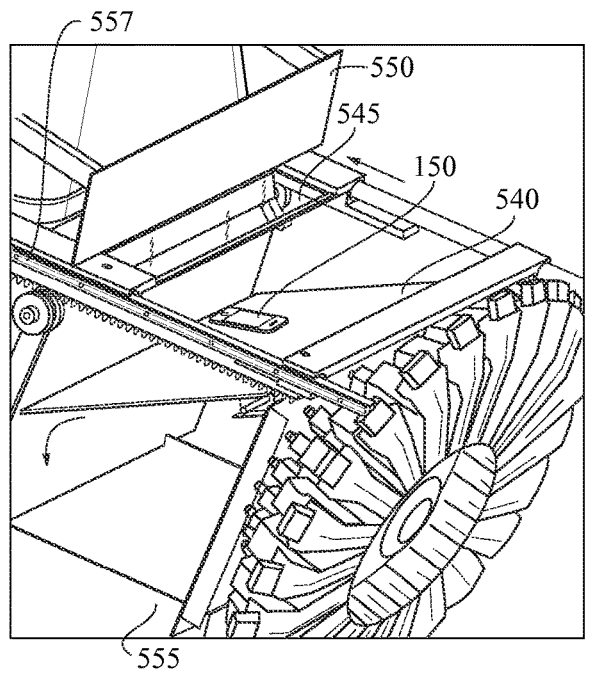
FIG. 11B is an isolated view of a phone being transferred in the kiosk.
Figure 11C:
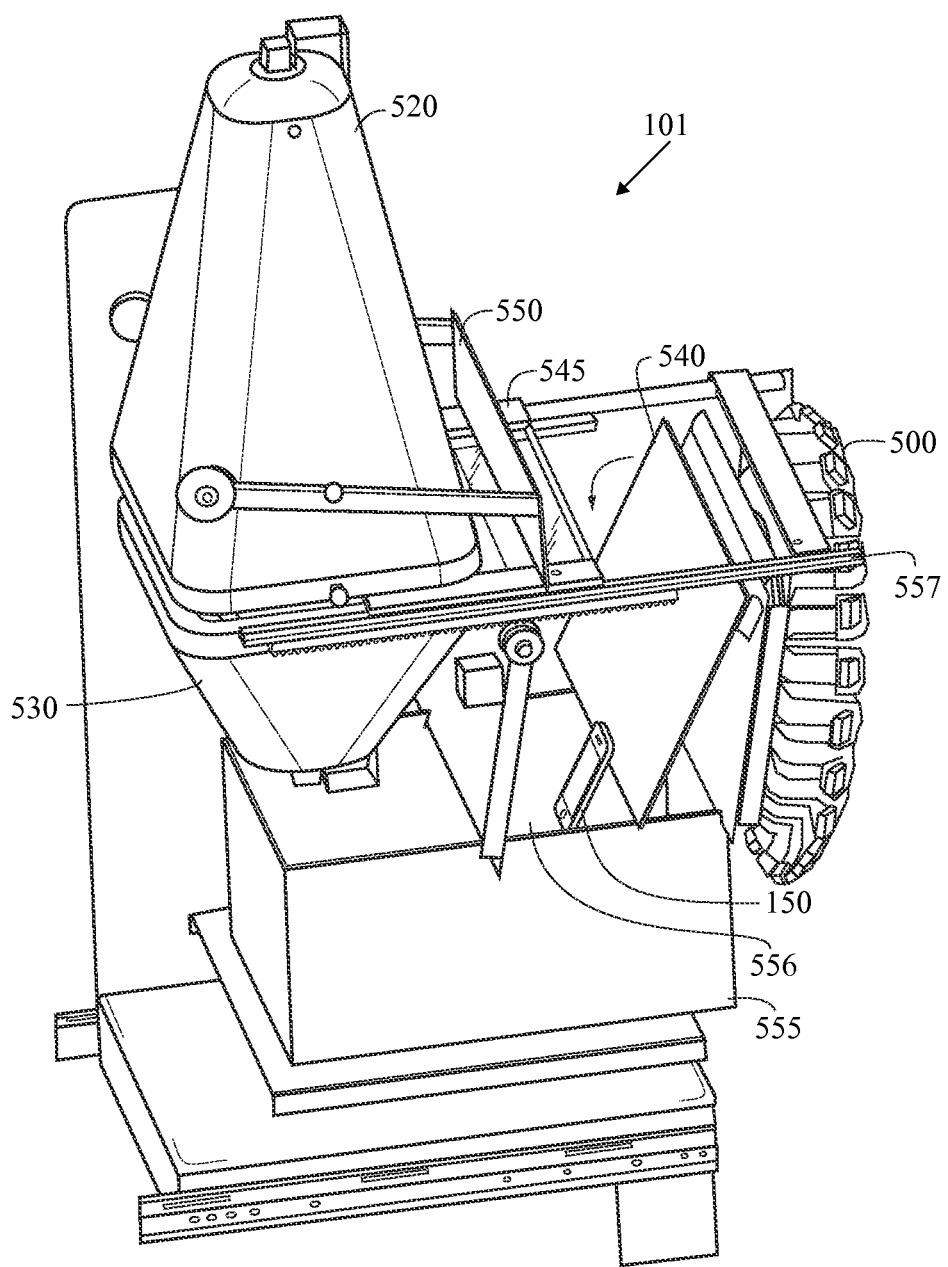
FIG. 11C is an isolated view of a phone being binned in the kiosk.

FIGS. 11, 11A, 11B, and 11C, show the automatic transport and binning of an electronic device 150 within the internal mechanism 101 of the kiosk 100. As shown in FIG. 11, the door 550 is lowered to reside above the transparent plate 545, which is then moved inward with the mobile phone 150 thereon. As shown in FIG. 11A, as the transparent plate 545 is moved inward, the mobile phone is blocked by the door 550 and engages binning plate 540 as the mobile phone begins to fall into an opening created by the inward movement of the transparent plate 545. As shown in FIG. 11B, once the mobile phone is on the binning plate 540, the binning plate 540 is slowly lowered on one side to open into the bin 555. As shown in FIG. 11C, the mobile phone 150 slowly falls through an opening 556 into the bin 555 to secure the mobile phone 150 and for collection at a later time. The entire process performed at a rate of speed to prevent damage to the electronic device being recycled.

The kiosk 100 is of a typical size and shape of a vending machine, such as a soda machine, coin changing machine, can recycling machine, or other vending machines. The housing 105 of the kiosk 100 protects the internal mechanism 101 and secures electronic devices submitted for recycling. The housing 105 is preferably constructed of a metal material, such as steel or aluminum, to prevent authorized access to the kiosk 100.

The inspection area 106 is preferably designed to permit a detailed visual inspection of an electronic device such as a mobile phone, tablet computer, e-reader, MP3 players, PDA. The walls of the inspection area are preferably white and/or mirrored to provide imaging of the electronic device.

The couplings from the kiosk 100 and to a remote computer are preferably a single coupling to a communications network such as the internet via wired LAN, wireless LAN, cellular or any other proprietary communications system. The Kiosk 100 preferably includes a processor 160 for processing the information obtained from the mobile phone and for controlling the components of the kiosk 100. Preferably, the processor 160 is a standard personal computer ("PC") or other type of embedded computer running any operating system such as Linux or MAC OS. The processor 160 is most preferably a small form factor PC with integrated hard disk drive ("HDD"), central processing unit ("CPU") and universal serial bus ("USB") ports to communicate with the other components of the kiosk 100. One most preferred CPU is a DELL PC OPTIPLEX 780. Alternatively, the processing means is a microprocessor with a standalone motherboard which interfaces to a discrete HDD, power supply and the other components of the kiosk 100. The kiosk 100 preferably includes a memory 161 or other storage device, such as a disk drive, that stores the executable applications, test software, databases and other software required to operate the recycling kiosk 100.

The external communication component for the kiosk 100 preferably includes a wired Ethernet to provide connection to the internet, or alternatively the external communication component includes a wireless modem such as GSM, CDMA, 3G and 4G technologies for data communications.

Figure 14:
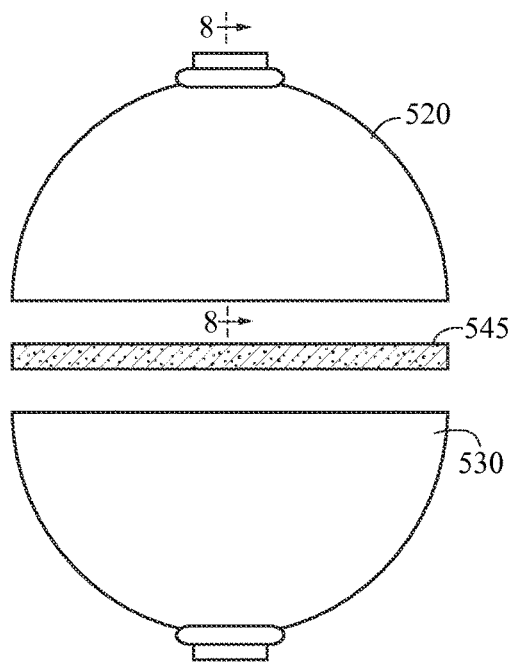
FIG. 14 is an isolated view of an inspection area of a kiosk.
Figure 15:
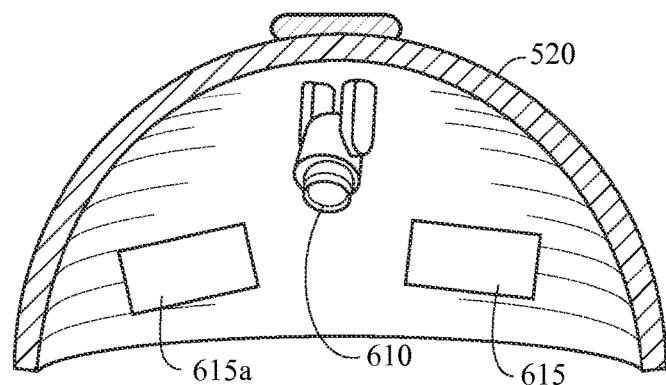
FIG. 15 is an isolated view of a camera in a dome of a kiosk.
Figure 16:
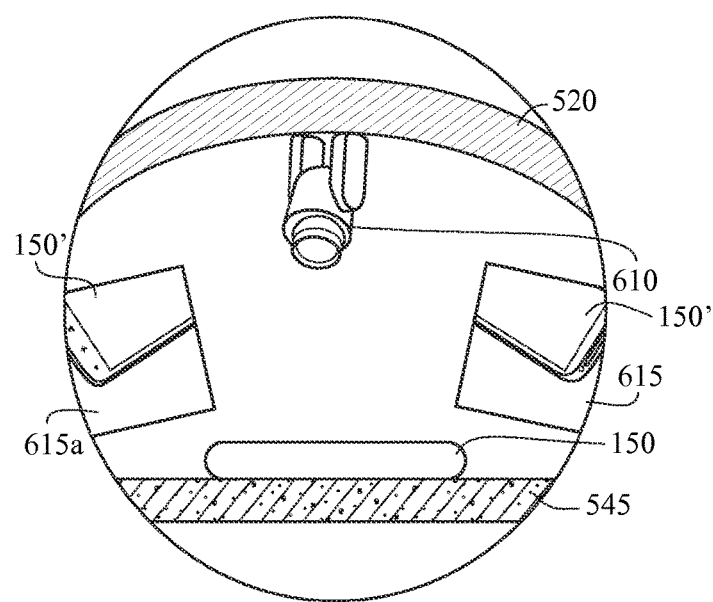
FIG. 16 is an isolated view of a phone in an inspection area of a kiosk.
Figure 17:
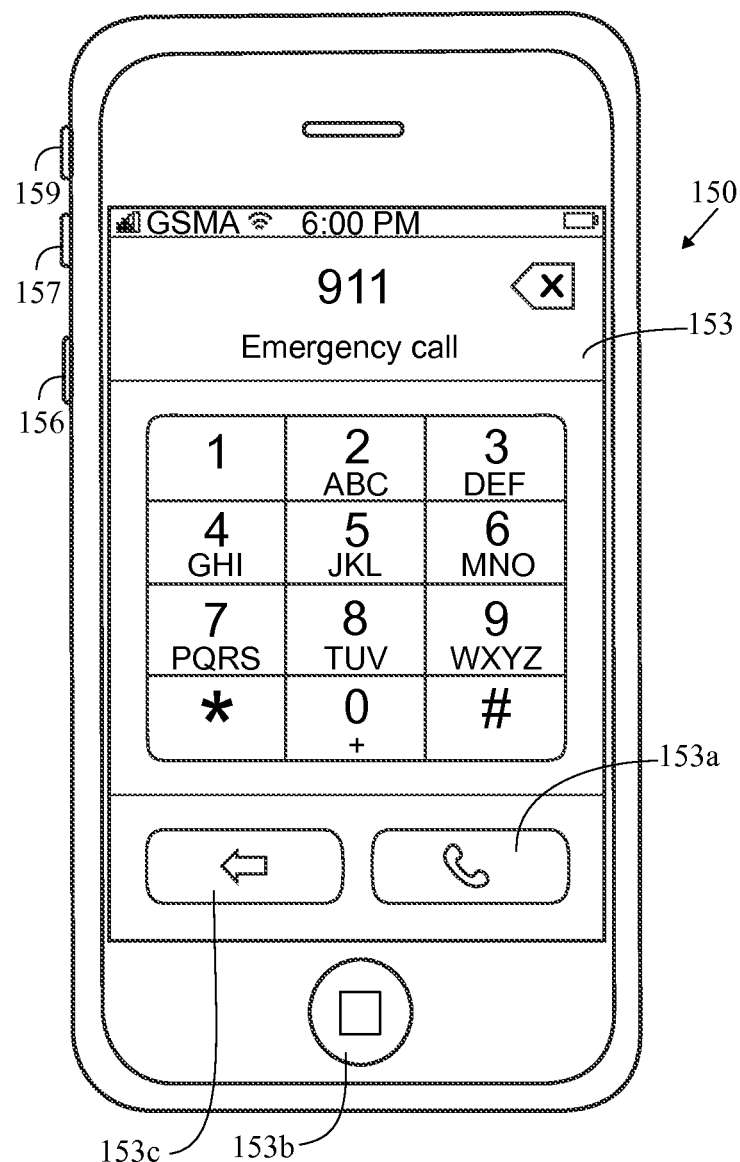
FIG. 17 is a front view of a phone.

As shown in FIGS. 14-16, the visual inspection of an electronic device such as a mobile phone 150 in the inspection area 106 is preferably performed by at least one camera 610 within the upper chamber 520. The lower chamber 530 also preferably has at least one camera or other imaging component such as a scanner. Alternatively, the visual inspection is performed by multiple cameras. A preferred camera 610 is a 1 megapixel machine vision camera. If a single camera 610 is utilized in the inspection area 106, the camera 610 preferably is movable to increase a field of view of the inspection area 106 to inspect the electronic device 150 such as a mobile phone placed on the transparent plate 545. The camera 161 is preferably movable. Preferably the camera 610 is positioned to image a LCD screen 153 of the electronic device 150 to determine if the LCD screen 153 is damaged. The interior surfaces of the upper chamber 520 and lower chamber 530 preferably include mirrors 615 in order to optimize viewing of an electronic device positioned within the inspection area 106. As shown in FIG. 16, a reflection 150' of a mobile phone 150 is illustrated. The camera 610 is also preferably movable to image a data port of the electronic device to determine the type of electrical connector 505 for the electronic device in order to perform an electrical analysis of the electronic device. Alternatively, the entire interior surfaces of the upper chamber 520 and the lower chamber 530 are mirrored for optimization of imaging of the electronic device. The camera(s) alternatively are CCD or CMOSS.

Also, time is of the essence when inspecting the electronic device. The analysis is completed within an illumination period of the electronic device, wherein the illumination device comprises the time from when the display screen of the electronic device is illuminated to the time the display screen converts to an energy conserving mode, evidences by the screen blacking out. During the inspection, the brightness of the illumination is also measured. The lighting preferably comprises LED based lighting with beam splitters, or alternatively UV lighting.

The transparent plate optionally operates as a weight scale to obtain a mass of the electronic device for use in determining a remuneration value. For example, if the mass of the electronic device 150 is less than set forth in a vendor specification for the electronic device, then one or more components of the electronic device may be missing, such as the battery for the electronic device 150.

Preferably, visual inspection and recognition software is utilized by the kiosk 100 to analyze an electronic device. In one preferred method, a recognition algorithm is applied to a specific make and model of a electronic device. The visual inspection and recognition software determines the borders of a electronic device 150 under inspection to determine the external dimensions of the electronic device 150. The external dimensions are utilized to determine a subset of possible mobile phones from a master database of mobile phones stored in the memory 161 of the kiosk 100 or available online to the kiosk 100 using external communications. The visual inspection and recognition software then preferably uses a set of secondary and tertiary features to further distinguish the electronic device 150. These secondary and tertiary features can include placement and size of the display screen, placements and size of the keyboard, unique buttons, placement of ports, and other distinguishing features. Once an exact make and model of the electronic device is determined, the visual inspection and recognition software subtracts an image of the electronic device 150 from an image of a perfect electronic device for the same make and model. The result of the subtraction is preferably a quantifiable number of pixels that are calibrated into categories of broken or missing parts, cracked screen, and low, medium or high wear.

Alternatively, the visual inspection is performed using neural network pattern recognition techniques to identify the mobile phone 150, then filter algorithms are utilized to determine defects such as cracked screens. Further, those skilled in the pertinent art will recognize that other visual inspection techniques may be employed without departing from the scope and spirit of the present invention.

The electrical analysis of an electronic device 150 is preferably performed using an electrical connector 505 connected to a data port of a electronic device 150 as discussed above in reference to FIGS. 2, 2A, 2B, 2C and 2D. Once the make and model of the electronic device 150 is determined, either by visual inspection or user input using a user interface such as touch screen display 115, the correct electrical connector 505 is dispensed by the carousel 500 for connection to the data port of the electronic device 150. The connection of the electrical connector 505 to the electronic device 150 is preferably performed automatically by the kiosk 100. Alternatively, the proper choice of electrical connector 505 is rotated into position on the carousel 500 and illuminated or in some other way presented to the consumer for manual connection of the electrical connector 505 to the data port of the electronic device 150. Electrical analysis software is preferably utilized by the kiosk 100 to interact with the electronic device 150. The electrical analysis preferably determines if the mobile phone is capable of activation, maintaining a charge, performing correctly, powering a display screen of the electronic device 150, providing make, model, serial number and other pertinent information about the electronic device 150, and other relevant information.

The touch screen display 115 preferably includes a keypad, user selection buttons, soft keys, and other similar components. The touch screen display 118 is used to enable quick and easy access to various features and functions of the recycling kiosk 100. The recycling kiosk 100 preferably dispenses various forms of payment, including cash, credit cards, debit cards, chip cards, gift cards from the kiosk's host location or other gift cards, and other magnetic striped cards or electronic payment methods. The kiosk 100 also uses the barcode reader to read the barcode identification on the inside of the battery pack. A UV detector is used for reading "invisible" barcodes in use by certain vendors such as Apple and others. The bar code reader, camera, and/or UV detector of the kiosk 100 is another technique used to identify the product model, IMEI #, and/or FCC ID. Alternatively, the kiosk 100 communicates with the electronic device 150 using wireless communications to test and if necessary erase data from the electronic device 150.

Figure 12:
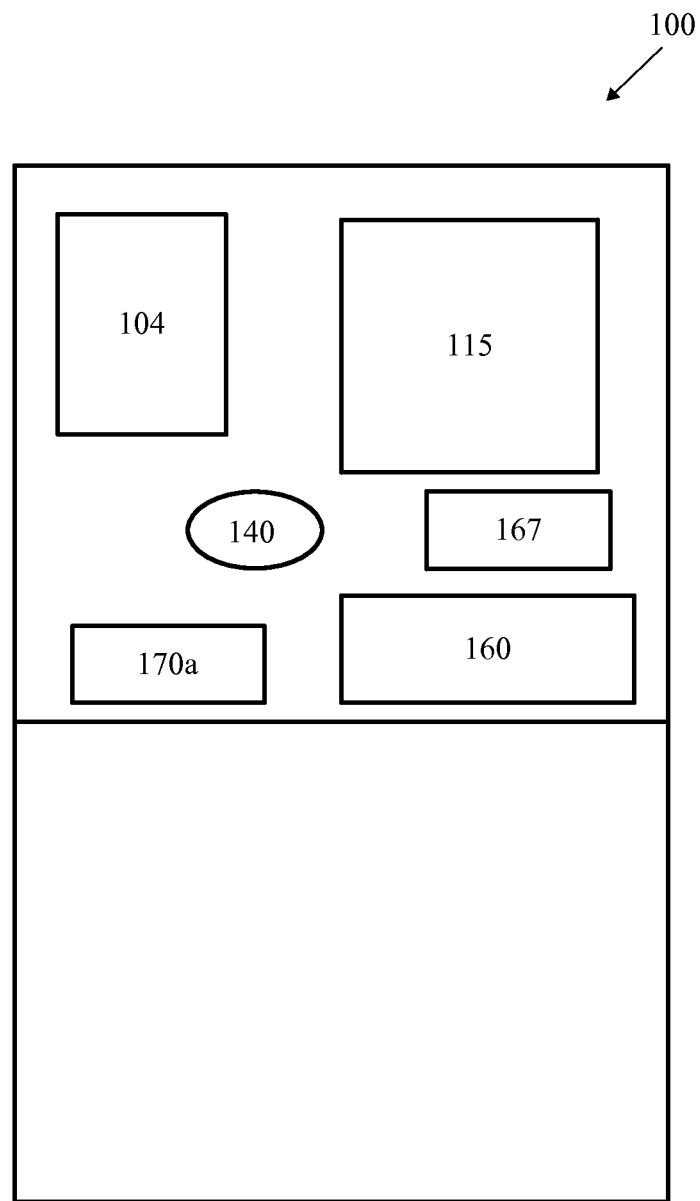
FIG. 12 is a block diagram of components of a recycling kiosk.
Figure 13:
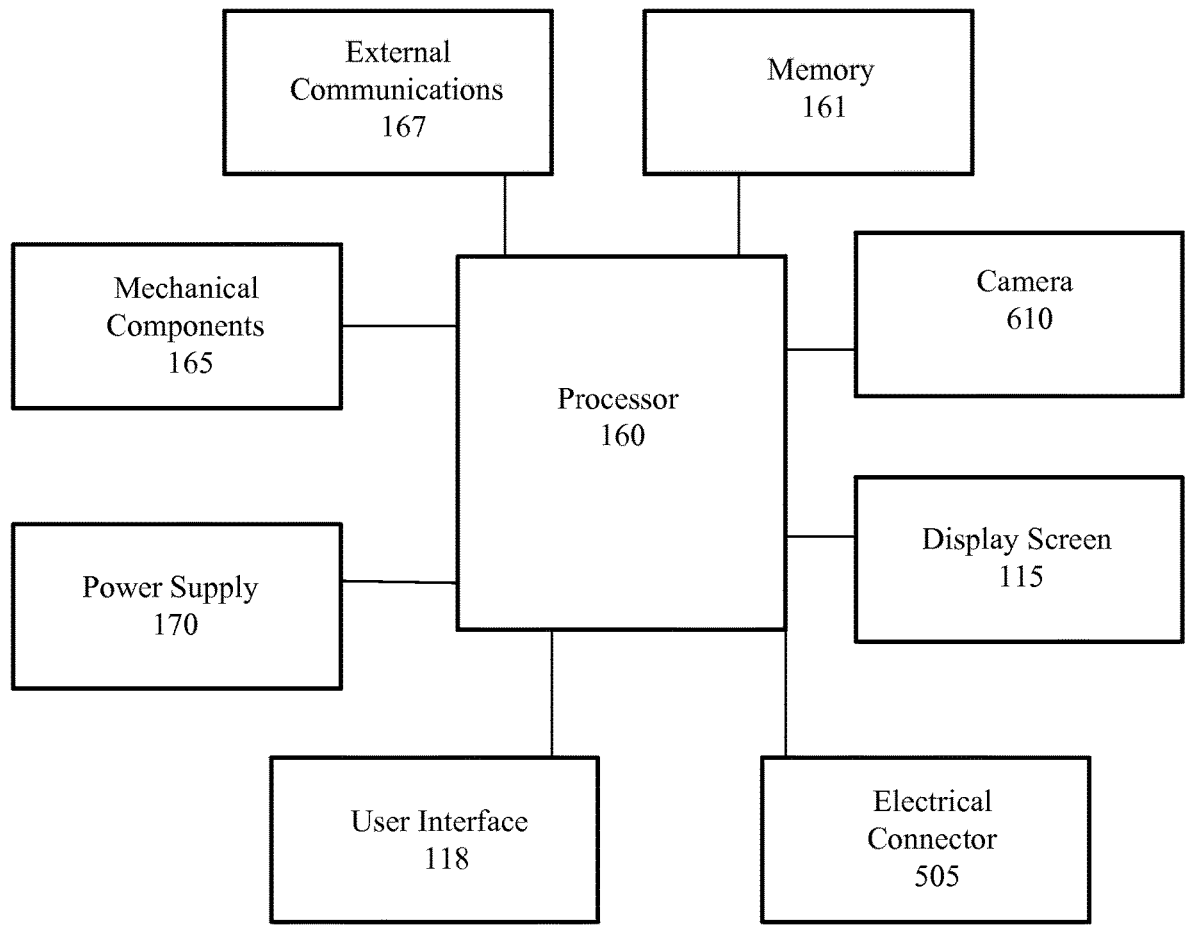
FIG. 13 is a block diagram of components of a recycling kiosk.

FIG. 13 is a block diagram of the main components of the kiosk 100. A processor 160 is preferably in communication with the other components of the kiosk 100. The memory 161 preferably contains a database of information on multiple mobile phones including images, physical characteristics, prices and other similar information. The external communications 167 preferably communicates through a wireless connection or Ethernet with a network to receive and transmit information to a remote site. The power supply 170 is preferably received through a plug-in connection to a wall outlet. The mechanical components 165 include the electrical connector carousel 500, the transparent plate 545, the binning plate 540, the door 550, and other similar components. The camera 610 or cameras, electrical connectors, and a user interface interact with the processor 160 as discussed above. FIG. 12 illustrates an internal back of a recycling kiosk 100. As shown a processor 160 is preferably a personal computer having a battery backup 170a, a wireless connection 167 for external communications, an electrical connection 140, a receipt dispenser 104 and a display screen 115.

The processor 160 identifies the electronic device 150 submitted for recycling using information from the visual inspection and user interface. The processor 160 also determines the proper electrical connector 505 for connection to the data port of the electronic device 150 using information obtained during the visual inspection or from the user interface. The processor 160 also directs and receives information from the electrical analysis of the electronic device 150 performed using the electrical connector 505 connected to the data port of the electronic device 150. The processor also preferably determines a financial remuneration for the submitted electronic device 150 based on the visual inspection, optionally the electrical analysis and data stored in the memory 161 of the kiosk or information provided externally through the external communication component 167.

Figure 19:
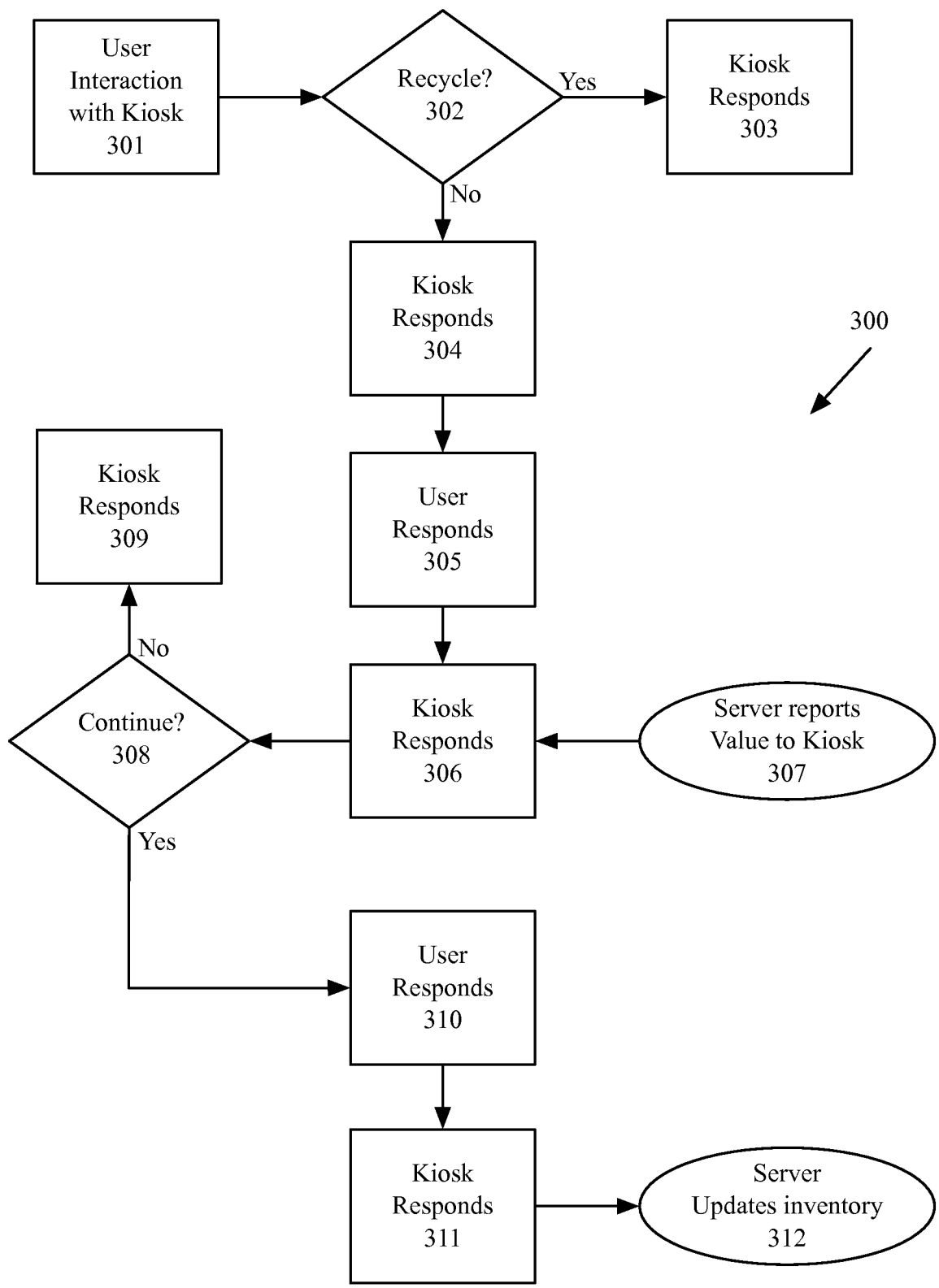
FIG. 19 is a flow chart for recycling an electronic device.

A flow chart for a preferred recycling method is shown in FIG. 19. At step 301 a customer elects to sell or recycle an electronic device. The customer checks to see if the electronic device is supported for sale/refurbishing from a list on the screen of the kiosk. The customer activates the on-screen menu system and either enters the phone model directly or goes through a series of menus to determine if the electronic device is eligible for sale or only for recycling. At decision block 302 it is determined if the electronic device is only available for recycling. If yes, (i.e. it is not on the list of electronic device available for reselling) the customer can insert the electronic device into receptacle at step 303 and the electronic device falls into bin 112 for recycling.

If the electronic device is supported for refurbishment/resale the customer is then encouraged to engage the testing/rating operation of the system. At step 304, the system has determined the correct connector to couple to the electronic device. Connectivity options and are not limited to cable, standard or proprietary connectors, hard docks, reading removable or external physical memory or other wireless methods like WiFi, Bluetooth, RFID, NFC, and the like. At step 305 the electronic device is connected and inserted into inspection area 106. If this has been done correctly, the customer is given some indication (e.g. a green light) and the system proceeds to step 306. At step 306 the electronic device is tested for operation using diagnostics and operating via, for example, the OMSI interface. The diagnostics preferably includes electrical and physical testing including testing the electronic device's battery, screen, memory, button functionality and structural integrity.

Preferably, the electronic device is imaged and analysis software is used to identify scratches, cracks, wear patterns, dents, broken or missing pieces, inclusion of features such as lenses, buttons, connectors, badges, labeling and/or branding. Identification may be done by image comparison or other similar methods where the image taken of the electronic device is normalized and compared to a reference image. Other inspection methods may be used in conjunction with visual and/or electrical testing including weighing to determine specific weight and use that data to further refine verification of manufacturer and verification of exact device model. In another embodiment, the photographic image is used to identify the correct manufacturer and model number/product number. Visual identification could include any combination of the following: calculations based upon measurement, physical (e.g., mm, inches), pixel count or other. Identification based upon electronic device dimensions, location/size of buttons, LCD and other physical characteristics. One camera or multiple cameras may be used to determine height, width, depth as needed. Identification based on OCR (Optical Character Recognition) of identifiers such as Carrier (for phone and tablet computers), brand, model, serial number, other identifiers. Identification based upon barcodes. Consumer may be asked to orient CE on its front, back, side and then asked to change orientation as needed. Consumer may even be asked to remove CE cover(s), batteries and the like in order to gain access to identifiable items, such alphanumeric or barcode data. The kiosk 100 provides a way to use visual inspection with electrical inspection to identify a device, determine its value, and reduce possible fraud.

In one embodiment, the kiosk 100 communicates with the carrier associated with a mobile phone to collect any information that could be germane to the device, including, for example, validation or authentication, registered ownership, account status, time in service, and the like. In some cases, when the customer's identification information does not match the registered owner information, the kiosk 100 automatically contacts the assumed owner in some manner (automated telephone call, email, text message, etc.) to alert the owner of the phone of the possible transaction.

Another feature of an embodiment of the kiosk 100 is to determine if there is personal information on the electronic device. This is determined by the presence of data in particular storage registers in the memory (e.g., quick-key stored numbers) or by looking at file types (jpegs, mp3's, etc.), or just assuming all non-default storage locations must contain personal data. The customer is offered the chance to erase the data from the phone. One option allows the customer to request that the data be first downloaded and then sent to a location designated by the customer (e.g., email address, website, etc.). In another embodiment, there is a slot for the customer to enter a memory card (e.g. USB drive. memory stick, etc.) whereupon the kiosk 100 uploads the data to the memory device. In still another embodiment, the kiosk 100 offers a web location from which the user retrieves the data at some later time if desired. In another embodiment, the user elects to have the data placed in another electronic device purchased by the customer at the kiosk 100 or in the location of the kiosk 100 or some other store. The customer preferably selects a user name and password to access the system provided storage location.

Once the value is determined, the value is provided at step 307 to the kiosk. The kiosk 100 then offers the customer a price or other remuneration for the phone that is typically less than the resale value. In other embodiments, the kiosk 100 offers the customer a price or remuneration that is at the current real-time market price. At step 308 it is determined if the user wishes to accept the offer. If not, the kiosk 100 proceeds to step 309 and opens the door and releases the electronic device back to the customer. If the user wishes to accept the offer, the kiosk 100 proceeds to step 310. At a point where the user accepts a price, the kiosk 100 may then lock down the inspection area to prevent further access to the electronic device by the user. The kiosk 100 then disconnects any cables that have been attached. At step 310, the user indicates acceptance of the decision by confirming on the keypad or touch-screen. At this point the kiosk 100 proceeds with deleting the personal data from the electronic device. In addition, once the transaction is confirmed, the kiosk 100 tags the electronic device with a transaction number that is associated with the diagnostic data and the transaction itself. This is preferably a printed adhesive label that is affixed physically to the phone and/or the loading of electronic data corresponding to the transaction number onto the phone itself for traceability purposes.

At step 311, the kiosk 100 completes any additional testing and diagnostics of the electronic device, disconnects the cable from the electronic device, and prints a receipt for the customer. Transfer of funds may be authorized via the kiosk 100 by crediting a customer credit card or account by dispensing cash, or by dispensing a voucher or coupon. At step 312 the kiosk 100 updates its inventory database and transmits the update via a communications network to a kiosk server.

Figure 20:
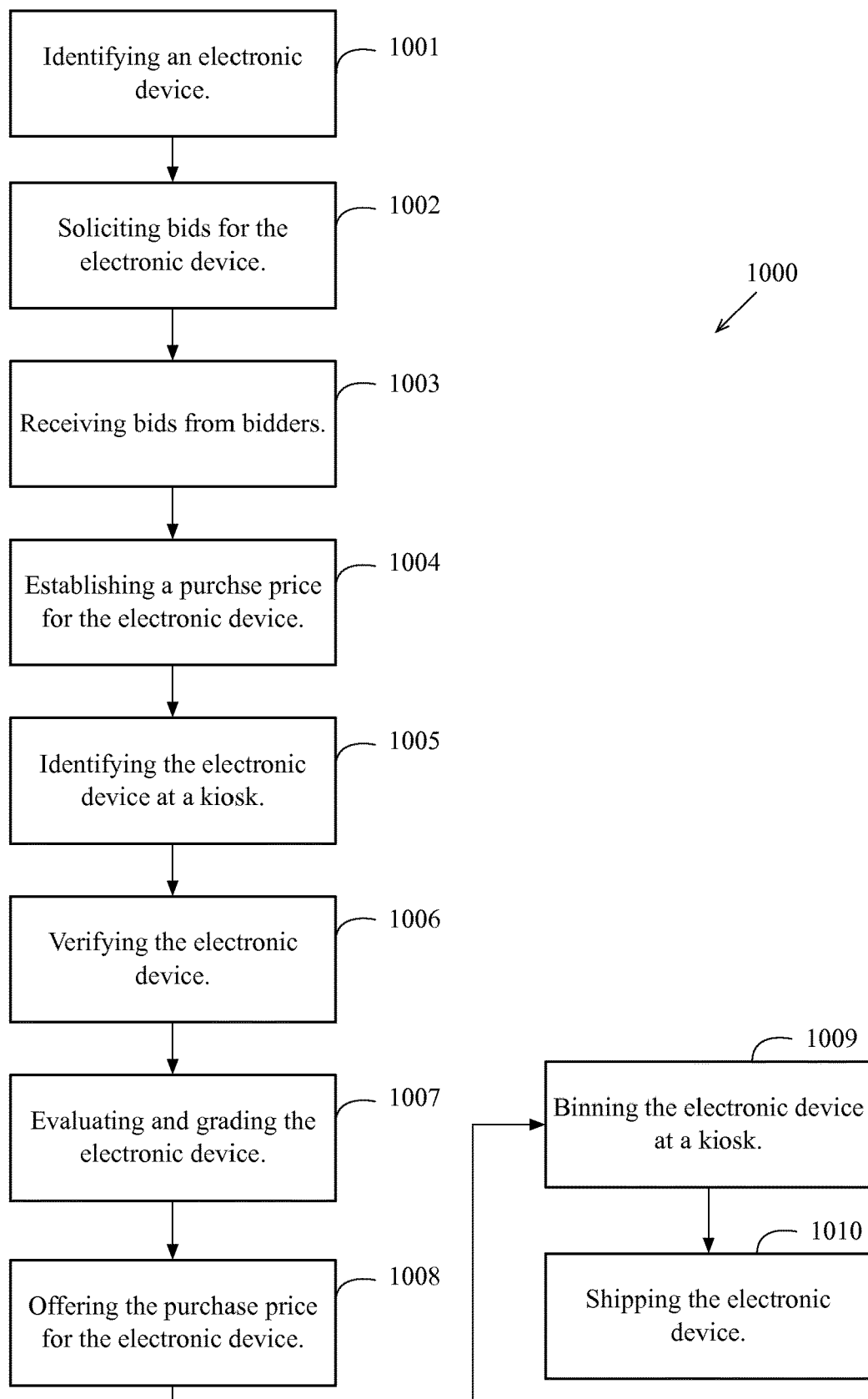
FIG. 20 is a flow chart for a pre-acquisition auction method.

One preferred method for a pre-acquisition auction is illustrated in the flow chart of FIG. 20. A method for analysis of an electronic device and financial remuneration to a user for submission of the electronic device is generally designated 1000. At block 1001, an electronic device is identified. At block 1002, bids are solicited for a used model of the electronic device in a predetermined condition. The bids are preferably solicited online through a website and the bidders are preferably pre-qualified. At block 1003, bids for the used model of the electronic device are received from a plurality of bidders. At block 1004, a purchase price to pay for the used model of the electronic device is set based on the plurality of bids received from the plurality of bidders. Typically, the purchase price is based on the winning bid. The shipping information for the winning bidder is preferably obtained at this time. At block 1005, a used model of the electronic device is identified at a recycling kiosk for the electronic device. Preferably, a consumer desires to recycle the electronic device. At 1006, the integrity of the used model of the electronic device is verified at the recycling kiosk. Preferably, the condition of the electronic device is established at the kiosk, with the kiosk determining any damage to the electronic device based on visual and electronic analysis of the electronic device. At block 1007, the electronic device is evaluated and graded. At block 1008, the purchase price for the used model of the electronic device is offered to a consumer at the kiosk. At block 1009, the electronic device is automatically binned after purchasing the used model of the electronic device from the consumer at the kiosk. At block 1010, the electronic device is shipped to the winning bidder.

Preferably, the kiosk 100 of the method comprises a housing 105, the housing 105 comprising a user interface on an exterior surface of the housing for the user to input information, an upper dome and a lower dome, wherein the upper dome and the lower dome comprise a plurality of mirrors. The kiosk 100 further comprises an upper chamber camera, a lower chamber camera and a transparent surface. The kiosk 100 further comprises a processor 160 within the housing and in communication with the at least one camera, the processor 160 configured to identify the brand and model number of the mobile communication device based on at least one of the information from the user and the images from the at least one camera, the processor 160 configured to determine a purchase price for the used model of the mobile communication device.

An alternative method for a pre-acquisition auction begins with a mobile communication device identified for acquisition. Bids are solicited for a used model of the mobile communication device. Bids for the used model of the mobile communication device are received from a plurality of bidders. A purchase price to pay for the used model of the mobile communication device is set based on the plurality of bids received from the plurality of bidders. A used model of the mobile communication device is identified at a recycling kiosk for the mobile communication device. The integrity of the used model of the mobile communication device is verified at the recycling kiosk. The purchase price for the used model of the mobile communication device is offered to a consumer at the kiosk. The mobile communication device is automatically binned after purchasing the used model of the mobile communication device from the consumer at the kiosk. The mobile communication device is shipped to the winning bidder.

Another alternative method for a pre-acquisition auction begins with establishing a plurality of pre-acquisition purchase prices. Each of the plurality of pre-acquisition purchase prices is established for a recycled electronic device in a predetermined condition. Each of the pre-acquisition purchase prices is established by a winning bid from a bidder of a plurality of bidders for a recycled electronic device. An electronic device is positioned in an inspection area of a kiosk. The inspection area has at least one camera. The electronic device or a portion thereof is imaged. The image of the electronic device obtained by the at least one camera disposed in the inspection area is inspected to determine if the electronic device has any defects. The electronic device is identified and a condition of the electronic device is determined. A matching pre-acquisition purchase price is selected from the plurality of pre-acquisition purchase prices for the electronic device. A consumer is offered the pre-acquisition purchase price for the electronic device.

Figure 21:
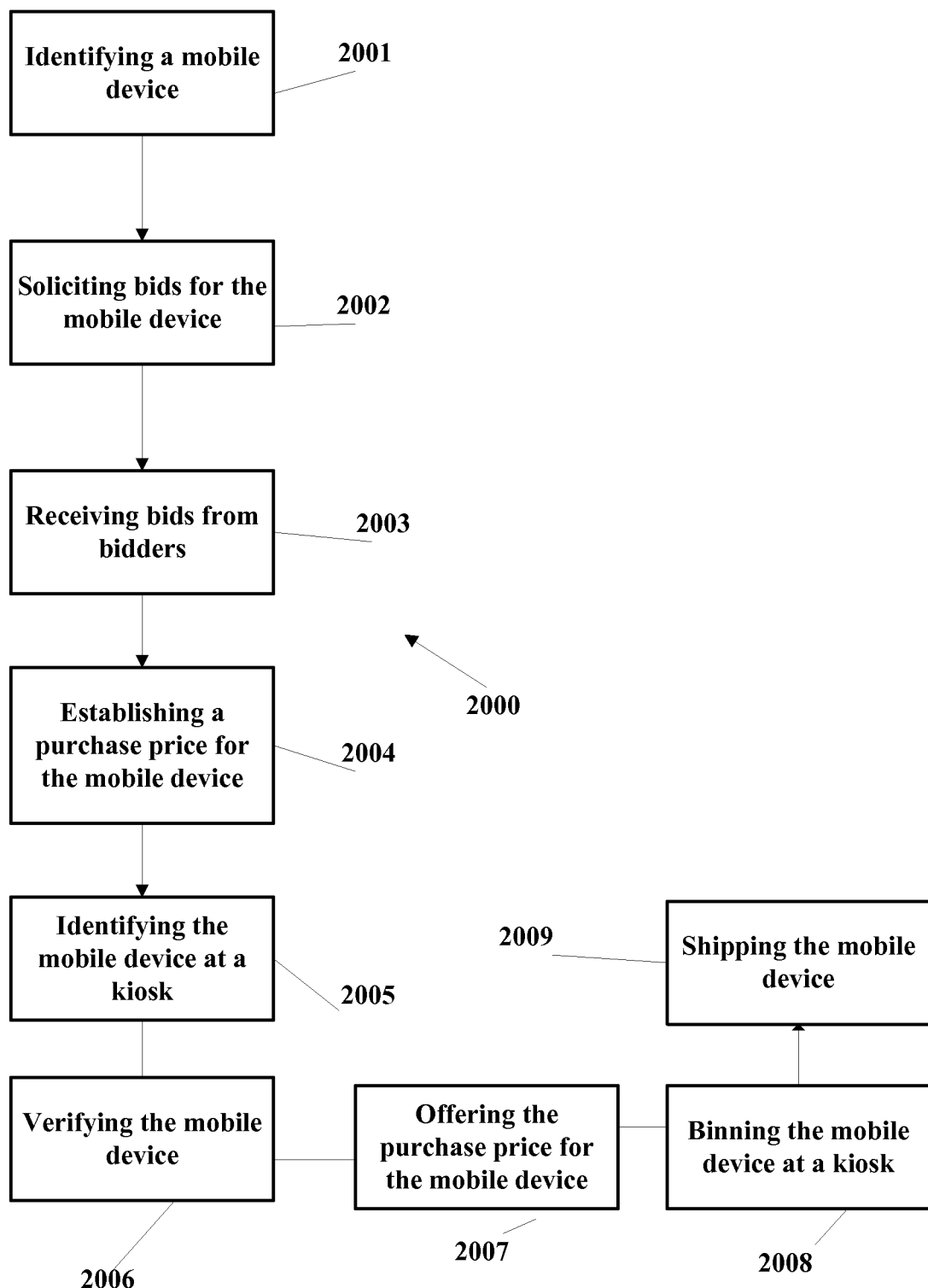
FIG. 21 is a flow chart of a method for analyzing an electronic device.

An alternative method of the present invention is illustrated in the flow chart of FIG. 21. A method for analysis of an electronic device and financial remuneration to a user for submission of a mobile communication device is generally designated 2000. At block 2001, a mobile communication device is identified. At block 2002, bids are solicited for a used model of the mobile communication device. At block 2003, bids for the used model of the mobile communication device are received from a plurality of bidders. At block 2004, a purchase price to pay for the used model of the mobile communication device is set based on the plurality of bids received from the plurality of bidders. At block 2005, a used model of the mobile communication device is identified at a recycling kiosk for the mobile communication device. At 2006, the integrity of the used model of the mobile communication device is verified at the recycling kiosk. At block 2007, the purchase price for the used model of the mobile communication device is offered to a consumer at the kiosk. At block 2008, the mobile communication device is automatically binned after purchasing the used model of the mobile communication device from the consumer at the kiosk. At block 2009, the mobile communication device is shipped to the winning bidder.

Alternatively, the method comprises imaging a screen shot of a known screen of a battery charging screen display of the electronic device and inspecting the screen shot of the known screen of the battery charging screen display of electronic device obtained by at least one camera.

The present invention further includes is a dome shaped apparatus, the dome shaped apparatus comprising an upper dome, a lower dome. The upper and lower dome comprises a plurality of walls, wherein the plurality of walls are composed of mirrors. The dome shaped apparatus further comprises a transparent surface and at least one camera, the camera capable of obtaining a 360 degree view of an electronic device placed within the dome shaped apparatus. The upper dome preferably comprises an upper chamber camera. The lower dome preferably comprises a lower chamber camera. Preferably, a combination of each of the upper dome and lower dome cameras and the plurality of mirrors allow for an image of the device placed on the transparent surface. Preferably, the combination of each of the upper dome and lower dome cameras and the plurality of mirrors allow for a 360 degree of the electronic device placed on the transparent surface. Preferably, each of the upper dome and lower dome cameras are moveable.

Alternatively, the mobile phone 150 positioned within an inspection area 106 of a kiosk 100. The mobile phone is powered up. A term is inputted into the mobile phone 150 for display on a LCD screen of the mobile phone 150. A preferred term is a telephone number for display on a LCD screen 153 as shown in FIG. 14. The term may also be a word, characters, or like inputs. The LCD screen 153 is inspected for damage such as cracks, pixel defects, discoloration and the like. The kiosk 100 inspects the LCD screen 153 for defects in the display of the telephone number or like term. Further, the luminescence of the LCD screen 153, particularly the telephone number, can also be measured to determine if the luminescence is performing at levels set forth by the manufacturer of the mobile phone 150. An optional electrical analysis is performed on the mobile phone 150 as discussed in more detail below. Lastly, the value of the mobile phone is determined as discussed in more detail below.

Figure 22:
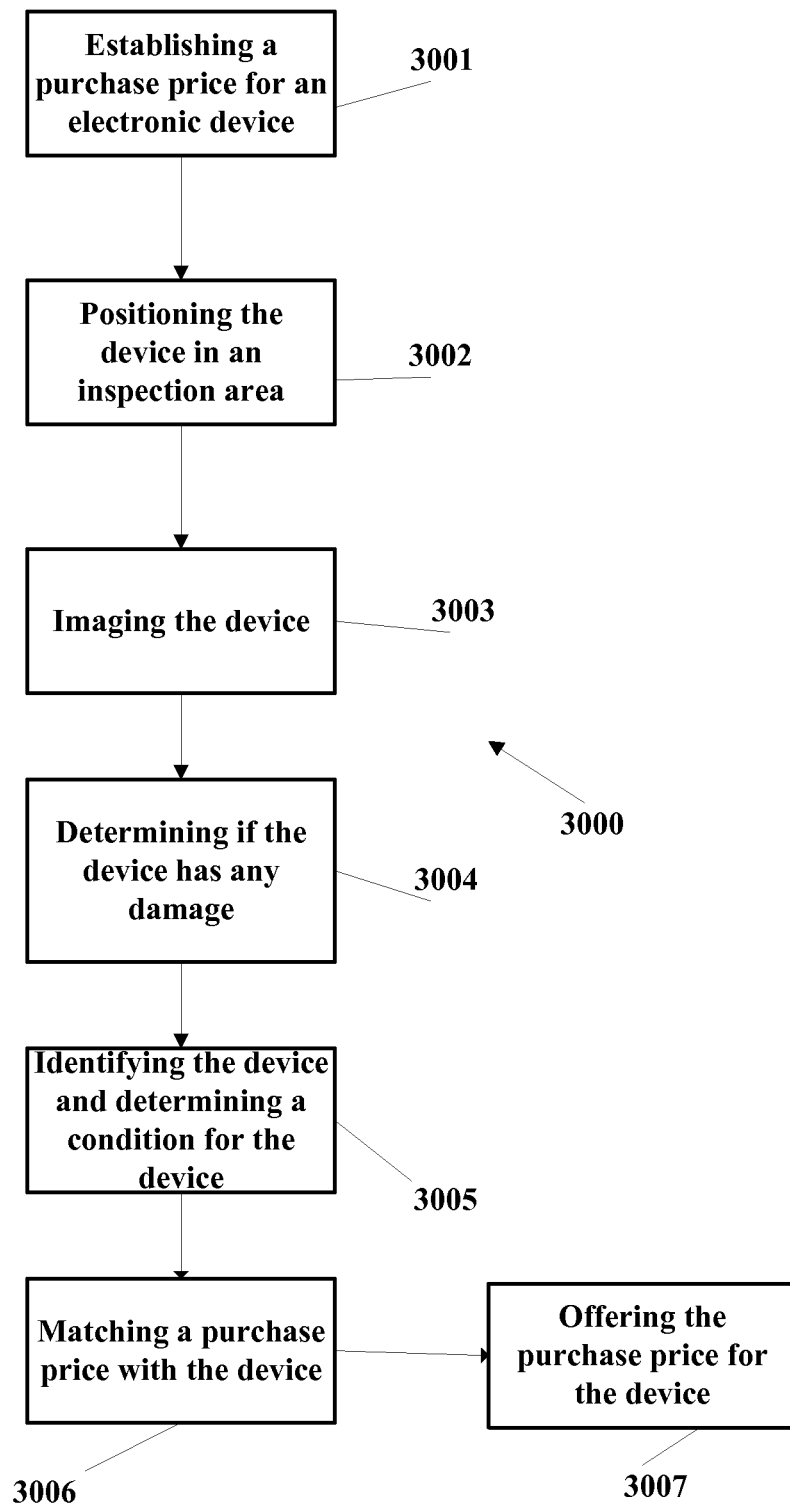
FIG. 22 is a flow chart of a method for analyzing an electronic device.

Yet another alternative method of the present invention is illustrated in the flow chart of FIG. 22. The method 3000 begins at block 3001 with establishing a plurality of pre-acquisition purchase prices. Each of the plurality of pre-acquisition purchase prices is established for a recycled electronic device in a predetermined condition. Each of the pre-acquisition purchase prices is established by a winning bid from a bidder of a plurality of bidders for a recycled electronic device. At block 3002, an electronic device is positioned in an inspection area of a kiosk. The inspection area has at least one camera. At block 3003, the electronic device or a portion thereof is imaged. At block 3004, the image of the electronic device obtained by the at least one camera disposed in the inspection area is inspected to determine if the electronic device has any defects. At block 3005, the electronic device is identified and a condition of the electronic device is determined. At block 3006, a matching pre-acquisition purchase price is selected from the plurality of pre-acquisition purchase prices for the electronic device. At block 3007, a consumer is offered the pre-acquisition purchase price for the electronic device.

Preferably, the method further comprises automatically binning the electronic device after determining the value of the electronic device. The method preferably comprises using the robotic finger to call a test phone number or alternatively to send a text a test phone number. The text preferably comprises each letter of the alphabet which allows determining the functionality of all letters of the keyboard. The method further comprises the text comprises a character string comprising the numbers 1 through 10, allowing determination of the functionality of all numbers on the keyboard. Further, the robotic finger may be used to send a text comprising each symbol on the keyboard. The method alternatively comprises using the robotic finger to active a camera mode of the electronic device such as disclosed in Bowles et al., U.S. patent application Ser. No. 13/658,828, filed on Oct. 24, 2012 for a Method And Apparatus For Recycling Electronic Devices, which is hereby incorporated by reference in its entirety, or such as disclosed in Bowles et al., U.S. patent application Ser. No. 13/658,825, filed on Oct. 24, 2012 for a Method And Apparatus For Recycling Electronic Devices, which is hereby incorporated by reference in its entirety.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes

We claim as our invention the following:

1. A method for analyzing a mobile electronic device and providing financial remuneration to a user for submission of the mobile electronic device, the method comprising:
   identifying a mobile electronic device;
   setting a purchase price to pay for a used model of the mobile electronic device;
   identifying a submitted mobile electronic device at a recycling kiosk as being an example of the used model of the mobile electronic device, wherein the recycling kiosk comprises—
      a housing;
      a user interface on an exterior surface of the housing for the user to input information;
      at least one camera; and
      a processor within the housing and in communication with the at least one camera, the processor configured to identify a brand and model number of the submitted mobile electronic device and perform an automatic visual analysis of the submitted mobile electronic device based on images from the at least one camera, the processor further configured to determine the purchase price for the submitted mobile electronic device;
   verifying integrity of the submitted mobile electronic device at the recycling kiosk;
   offering the purchase price for the submitted mobile electronic device at the kiosk; and
   purchasing the submitted mobile electronic device.

2. The method according to claim 1 further comprising automatically binning the submitted mobile electronic device after purchasing the submitted mobile electronic device.

3. The method according to claim 1 further comprising instructing the user to erase data of the submitted mobile electronic device prior to positioning the submitted mobile electronic device in the recycling kiosk.

4. The method according to claim 1 wherein the recycling kiosk further comprises:
   an upper chamber and a lower chamber, wherein the upper chamber comprises a plurality of mirrors;
   an upper chamber camera; and
   a lower chamber camera.

5. A method for analysis of a mobile electronic device and providing financial remuneration to a user for submission of the mobile electronic device, the method comprising:
   identifying a mobile electronic device;
   imaging the mobile electronic device to determine condition;
   interacting with a live representative at a call center for accurate determination of the condition of the mobile electronic device, wherein the representative is able to see real-time images of the mobile electronic device;
   setting a purchase price to pay for a used model of the mobile electronic device;
   identifying a submitted mobile electronic device at a recycling kiosk device as being an example of the used model of the mobile electronic device;
   verifying integrity of the submitted mobile electronic device at the recycling kiosk;
   offering the purchase price for the submitted mobile electronic device at the kiosk; and
   purchasing the submitted mobile electronic device, wherein the recycling kiosk comprises—
      a housing;
      a user interface on an exterior surface of the housing for the user to input information;
      at least one camera; and
      a processor within the housing and in communication with the at least one camera, the processor configured to identify a brand and model number of the submitted mobile electronic device and perform an automatic visual analysis of the submitted mobile electronic device based on images from the at least one camera, the processor further configured to determine the purchase price for the submitted mobile electronic device.

6. The method according to claim 5 further comprising instructing the user to erase data of the submitted mobile electronic device prior to positioning the submitted mobile electronic device in the recycling kiosk.

7. The method according to claim 5 wherein the recycling kiosk further comprises:
   an upper chamber and a lower chamber, wherein the upper chamber comprises a plurality of mirrors;
   an upper chamber camera; and
   a lower chamber camera.

8. The method according to claim 5 further comprising erasing data of the submitted mobile electronic device within an inspection area of the recycling kiosk.

9. The method according to claim 5 further comprising transferring data of the submitted mobile electronic device to a new mobile electronic device within an inspection area of the recycling kiosk.

10. The method according to claim 5 wherein the submitted mobile electronic device is one of a mobile phone, a tablet computer, an mp3 player, or a GPS device.

11. The method according to claim 5 further comprising automatically binning the submitted mobile electronic device after purchasing the submitted mobile electronic device.

12. The method according to claim 5 further comprising:
   soliciting bids for the used model of the mobile electronic device; and
   receiving bids for the used model of the mobile electronic device from a plurality of bidders.

13. The method according to claim 12 wherein the purchase price is based on the bids received from the plurality of bidders.

14. The method according to claim 12 wherein the purchase price is based on a winning bid.

15. The method according to claim 1, further comprising imaging a screen shot of an about page of the submitted mobile electronic device, wherein the verification of the integrity of the submitted mobile electronic device includes analyzing a text content of the about page and comparing the text content to a text content of another about page, or analyzing brightness in one or more regions of a display of the submitted mobile electronic device and comparing the brightness in the one or more regions of the display to a standard.

16. The method according to claim 1 further comprising:
   soliciting bids for the used model of the mobile electronic device; and
   receiving bids for the used model of the mobile electronic device from a plurality of bidders.

17. The method according to claim 16 wherein the purchase price is based on the bids received from the plurality of bidders.

18. The method according to claim 16 wherein the purchase price is based on a winning bid.

19. The method according to claim 1 further comprising communicating with a carrier associated with the submitted mobile electronic device and collecting information that is germane to the submitted mobile electronic device, including a registered owner, an account status, and/or time in service.

20. The method according to claim 19 further comprising:
    collecting identification information of the user; and
    when the identification information of the user does not match the registered owner, automatically contacting the registered owner to alert the registered owner of the submission of the submitted mobile electronic device by the user.

\* \* \* \* \*